United States Patent
Siri

(10) Patent No.: US 9,960,602 B2
(45) Date of Patent: May 1, 2018

(54) MAXIMUM POWER TRACKING AMONG DISTRIBUTED POWER SOURCES

(71) Applicant: THE AEROSPACE CORPORATION, El Segundo, CA (US)

(72) Inventor: Kasemsan Siri, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 982 days.

(21) Appl. No.: 14/313,527

(22) Filed: Jun. 24, 2014

(65) Prior Publication Data

US 2014/0319918 A1    Oct. 30, 2014

Related U.S. Application Data

(63) Continuation-in-part of application No. 13/462,112, filed on May 2, 2012, now Pat. No. 9,325,176.

(51) Int. Cl.
H02J 3/38    (2006.01)

(52) U.S. Cl.
CPC ............... *H02J 3/385* (2013.01); *Y02E 10/58* (2013.01); *Y10T 307/625* (2015.04)

(58) Field of Classification Search
CPC ....... H02J 3/385; Y10T 307/625; Y02E 10/58
USPC .......................................................... 307/82
See application file for complete search history.

(56) References Cited

U.S. PATENT DOCUMENTS

| | | | |
|---|---|---|---|
| 6,009,000 A | 12/1999 | Siri | |
| 6,281,485 B1 | 8/2001 | Siri | |
| 6,369,462 B1 | 4/2002 | Siri | |
| 6,433,522 B1 | 8/2002 | Siri | |
| 7,151,362 B1 | 12/2006 | Siri | |
| 7,193,872 B2 | 3/2007 | Siri | |
| 7,324,361 B2 | 1/2008 | Siri | |
| 7,564,149 B2 | 7/2009 | Siri et al. | |
| 7,773,395 B2 | 8/2010 | Siri | |
| 7,863,766 B2 | 1/2011 | Abolhassani et al. | |
| 7,964,991 B2 | 6/2011 | Siri | |
| 8,013,472 B2 | 9/2011 | Adest et al. | |
| 8,053,929 B2 | 11/2011 | Williams et al. | |
| 8,068,352 B2 | 11/2011 | Yu et al. | |
| 8,093,754 B2 | 1/2012 | Kernahan | |
| 8,106,526 B2 | 1/2012 | Abolhassani et al. | |
| 8,692,408 B2 | 4/2014 | Zhang et al. | |
| 8,872,384 B2 | 10/2014 | Stratakos et al. | |
| 2004/0212424 A1 | 10/2004 | Allred | |
| 2006/0017327 A1 | 1/2006 | Siri et al. | |

(Continued)

OTHER PUBLICATIONS

Elim Ortiz, "Notice of Allowance" issued in U.S. Appl. No. 13/462,112 dated Jan. 4, 2016.

(Continued)

*Primary Examiner* — Hal Kaplan
(74) *Attorney, Agent, or Firm* — LeonardPatel PC

(57) ABSTRACT

Optimum power tracking for distributed power sources may be provided by a family of power system architectures having distributed-input series-output (DISO) converters. The DISO converters may be controlled to achieve uniform input voltages across their respective distributed power sources while also tracking an optimum power point of the power system. Each DISO converter may be operably connected to a corresponding power source to form a power-processing channel. A controller may be operably connected to the plurality of DISO converters to control the operation thereof.

21 Claims, 29 Drawing Sheets

(56) References Cited

U.S. PATENT DOCUMENTS

| | | |
|---|---|---|
| 2006/0097519 A1 | 5/2006 | Steinke |
| 2006/0171182 A1 | 8/2006 | Siri et al. |
| 2006/0273770 A1 | 12/2006 | Siri |
| 2007/0159866 A1 | 7/2007 | Siri |
| 2008/0143188 A1 | 6/2008 | Adest et al. |
| 2008/0150366 A1 | 6/2008 | Adest et al. |
| 2008/0197825 A1 | 8/2008 | Siri |
| 2009/0206666 A1 | 8/2009 | Sella et al. |
| 2009/0212568 A1 | 8/2009 | Maibach et al. |
| 2010/0133816 A1 | 6/2010 | Abolhassani et al. |
| 2010/0157634 A1 | 6/2010 | Yu et al. |
| 2010/0213767 A1 | 8/2010 | Siri |
| 2010/0274401 A1 | 10/2010 | Kjaer et al. |
| 2010/0295383 A1 | 11/2010 | Cummings |
| 2010/0301670 A1 | 12/2010 | Wilhelm |
| 2010/0327666 A1 | 12/2010 | Abolhassani et al. |
| 2011/0012364 A1 | 1/2011 | Abolhassani et al. |
| 2011/0049994 A1 | 3/2011 | Hiller et al. |
| 2011/0077792 A1 | 3/2011 | Shimoda et al. |
| 2011/0084553 A1 | 4/2011 | Adest et al. |
| 2011/0273015 A1 | 11/2011 | Adest et al. |
| 2011/0273016 A1 | 11/2011 | Adest et al. |
| 2011/0291486 A1 | 12/2011 | Adest et al. |
| 2012/0068547 A1 | 3/2012 | Vermeersch et al. |
| 2013/0088081 A1 | 4/2013 | Siri |
| 2013/0249319 A1 | 9/2013 | Cummings |

OTHER PUBLICATIONS

Elim Ortiz, "Non-Final Office Action" dated Mar. 6, 2015 for U.S. Appl. No. 13/462,112.

Kasemsan Siri, "System Maximum Power Tracking Among Distributed Power Sources," presented at 2014 IEEE Aerospace Conference at Big Sky, Montana on Mar. 5, 2014.

Siri et al., "Current-Sharing\Voltage-Distribution Control for Interconnected DC-DC Converters," International Energy Conversion Engineering Conference, Jun. 25-27, 2007.

Siri et al., "Fault-Tolerant Scaleable Solar Power Bus Architectures with Maximum Power Tracking," The Applied Power Electronics Conference, pp. 1009-1014, Mar. 4-8, 2001.

Siri et al., "Independently Sourced Parallel-Connected Power Systems with Maximum Power Tracking," The Applied Power Electronics Conference, pp. 533-539, Feb. 9-13, 2003.

Siri et al., "Optimum Energy Harvesting among Distributed Power Sources with Uniform Voltage Distribution," IEEE, Mar. 5, 2012.

Siri et al., "Optimum Power Tracking among Series-Connected Power Sources with Uniform Voltage Distribution," IEEE, Mar. 7, 2011.

Siri et al., "Optimum Power Tracking among Series-Connected Power Sources with Uniform Voltage Distribution," Rangsit Journal of Arts and Sciences, vol. 1, No. 1, Jan.-Jun. 2011.

Siri et al., "Parallel-Connected Converters with Maximum Power Tracking," The Applied Power Electronics Conference, Mar. 10-14, 2002.

Siri et al., "Performance Limitations of Random Current-sharing Parallel-Connected Converter Systems and Their Solution," The Applied Power Electronics Conference, pp. 860-866, Feb. 15-19, 1998.

Siri et al., "Uniform Current-Sharing Control for Independently-Sourced Series-Input Connected Converters," International Energy Conversion Energy Conference, Jul. 28-30, 2008.

Siri et al., "Uniform Voltage Distribution Control for Paralleled-Input, Series-Output Connected Converters," IEEE, Mar. 2006.

Siri et al., "Uniform Voltage Distribution Control for Series Connected DC-DC Converters," IEEE Transactions on Power Electronics, vol. 22, No. 4, Jul. 2007.

Siri et al., "Uniform Voltage Distribution Control for Series Connected DC-DC Converters," IEEE Transactions on Power Electronics, vol. 22, pp. 1269-1279, Jul. 2007.

Siri et al., "Uniform Voltage Distribution Control for Series-Input Parallel-Output, Connected Converters," IEEE, Mar. 2006.

Elim Ortiz, "Final Office Action" dated Sep. 11, 2015 for U.S. Appl. No. 13/462,112.

MAXIMUM POWER TRACKING AMONG DISTRIBUTED POWER SOURCES

CROSS-REFERENCE TO RELATED APPLICATION

This application is a continuation-in-part of, and claims the benefit of, U.S. patent application Ser. No. 13/462,112, filed on May 2, 2012. The subject matter of this earlier filed application is hereby incorporated by reference in its entirety.

FIELD

The present invention generally relates to uniform input voltage distribution (UIVD) control, and more particularly, to UIVD control for distributed input series output (DISO) converter power systems.

BACKGROUND

Certain issues can arise in conventional power and control architectures that employ multiple solar arrays. Distributed array voltages may fail to achieve uniform distribution when their array panels are not identical, such as their current-voltage (I-V) curves having approximately the same peak-power voltages that respectively deliver different peak-power ratings. Also, too many maximum power tracking (MPT) controllers may be employed dedicated to their respective array panels, leading to a high part count. Further, a simpler and common MPT controller may not be present that tolerates at least a power source failure while the non-identical power sources are independently sourcing their powers to a power system consisting of distributed power channels for processing their respective distributed power sources. Accordingly, an improved power system control architecture may be beneficial.

SUMMARY

Certain embodiments of the present invention may provide solutions to the problems and needs in the art that have not yet been fully identified, appreciated, or solved by conventional power and control architectures. For example, some embodiments of the present invention pertain to a family of power system architectures where distributed-input series-output (DISO) converters are controlled to achieve uniform input voltages across their respective distributed power sources while also tracking an optimum power point of the power system. The optimum power point is a maximum power drawn from distributed power sources while voltages of the distributed power sources are uniformly distributed. With sufficient uniform input voltage distribution control, near maximum use of the power sources is achieved by employing a single MPT controller instead of multiple MPT controllers dedicated for each power source. Provided that the maximum power point voltages of the input power sources are similar, the resulting power system architectures offer near-maximum power transfer with a lower parts count.

In accordance with an embodiment of the present invention, an apparatus is provided. The apparatus includes a plurality of DISO converters connected to a corresponding power source. The apparatus also includes a controller connected to the plurality of DISO converters, the controller configured to provide uniform input voltages across each power source while tracking an optimum power point.

In another embodiment of the present invention, an apparatus is provided. The apparatus includes a multi-channel DISO power system. The multi-channel DISO power system includes outputs that are connected in series across a battery bank. The apparatus also includes a controller configured to apply a plurality of distributed control voltages. Each of the plurality of distributed control voltages is connected across a control input port of each independently sourced DISO converter such that uniform input voltage is achieved across each of a plurality of power sources.

In yet another embodiment of the present invention, an apparatus is provided. The apparatus includes a plurality of distributed-input series-output (DISO) converters and a system controller. Each of the plurality of DISO converters comprises an input connected to a corresponding power source, and is configured to provide a total output bus current signal fulfilling a system load demand and a total sourcing current signal. The total sourcing current signal may be a summation of all sourcing current signals drawn from a plurality of distributed power sources. The system controller is configured to receive a plurality of sourcing voltage signals from the plurality of distributed power sources, and generate a plurality of output voltage control signals for equal sourcing voltages at all times. The system controller is further configured to receive the total sourcing current signal or the total output bus current signal, and generate a plurality of the output voltage control signals to draw a total maximum power from the plurality of distributed power sources when in a maximum power tracking mode. The system controller is also configured to regulate a system output voltage signal received from the plurality of DISO converters when in a non-maximum power tracking mode.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Distributed power sources, such as solar array panels where power flows are individually processed through their respective DC-DC converters, have become practical for flexible and reliable direct current (DC) power transmission from the sources to the loads that are commonly terminated across the system output. Currently, there are at least three possible approaches for drawing power from distributed power sources: (1) drawing power directly across each distributed power source with GT-UCD control among distributed source currents (see FIG. 1); (2) drawing power directly across the distributed power sources with GT-UVD control of their sourcing voltages (see FIG. 2); and (3) drawing power directly across the individual power sources, with each power source possessing its own IMPT (see system diagram 300 of FIG. 3). However, each of these three approaches has at least the limitations that are discussed below.

Figure 1:
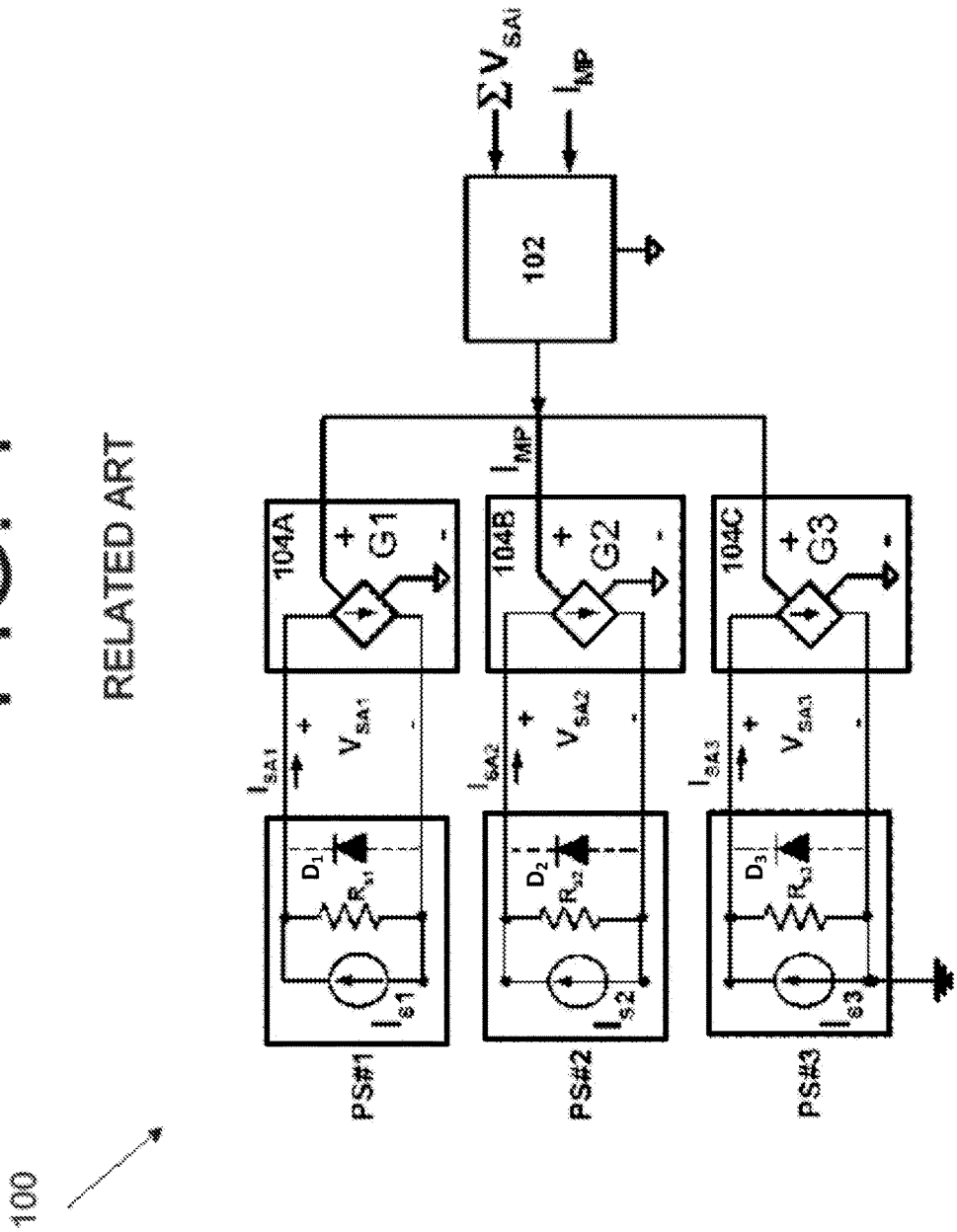
FIG. 1 illustrates a diagram for an energy harvesting approach with group tracking using uniform source-current distribution (GT-UCD).

FIG. 1 illustrates a diagram 100 for an energy harvesting approach with GT-UCD. FIG. 1 illustrates a single MPT controller 102, converters 104A-C, and power sources PS#1, PS#2, and PS#3. Each power source PS#1, PS#2, and PS#3 is represented by a respective current source $I_{S1}$, $I_{S2}$, $I_{S3}$, a respective source resistor $R_{S1}$, $R_{S2}$, $R_{S3}$, and a respective diode $D_1$, $D_2$, $D_3$. Each converter 104A, 104B, and 104C is represented by a respective controlled current sink G1, G2, G3 that is controlled in common by the commanding peak-power current signal $I_{MP}$. The GT-UCD approach shown in FIG. 1 is not only inefficient, but also fails to fully utilize distributed power sources PS#1, PS#2, and PS#3, especially when power sources PS#1, PS#2, and PS#3 possess non-identical I-V characteristics.

Further, the delivered peak power from the GT-UCD approach shown in FIG. 1 is below the ideal available peak power when a power source becomes weak and acts as a power dissipater instead of a power provider. Weak solar panels may include a bypass diode across their two sourcing terminals to clamp their negative voltage to a minimum. However, power delivery can still fall significantly below the available peak power. In this embodiment, G1, G2, and G3 may be controlled current sinks, each of which can be realized as a DC-DC converter 104A, 104B, 104C that has its input current controlled to follow the commanding peak-power current signal IMP.

Figure 2:
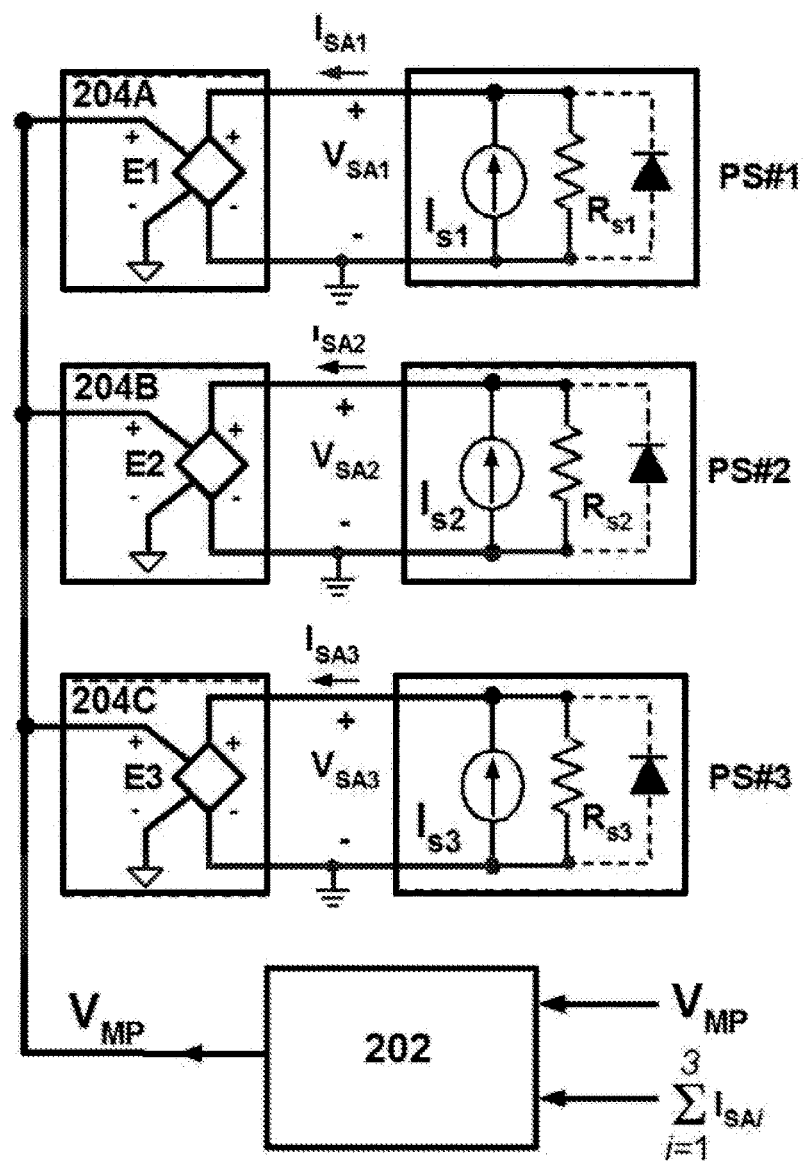
FIG. 2 illustrates a system diagram for an energy harvesting approach with group tracking using uniform voltage distribution (GT-UVD) control.

FIG. 2 illustrates a system diagram 200 for an energy harvesting approach with GT-UVD control. FIG. 2 illustrates a single MPT controller 202, converters 204A-C, and power sources PS#1, PS#2, and PS#3. In FIG. 2, the GT-UVD approach employs distributed DC-DC converters 204A-C, which are individually connected across their respective power sources PS#1, PS#2, and PS#3 to regulate their sourcing voltages $V_{SA1}$, $V_{SA2}$, $V_{SA3}$ to be uniformly distributed at all times. In most cases, the GT-UVD approach results in a much higher delivered peak power compared to that obtained by the GT-UCD approach. For example, when the maximum power point voltages $V_{MP}$ of the sources are similar, uniform distribution of the power source voltages ensures that they all become power providers.

Figure 3:
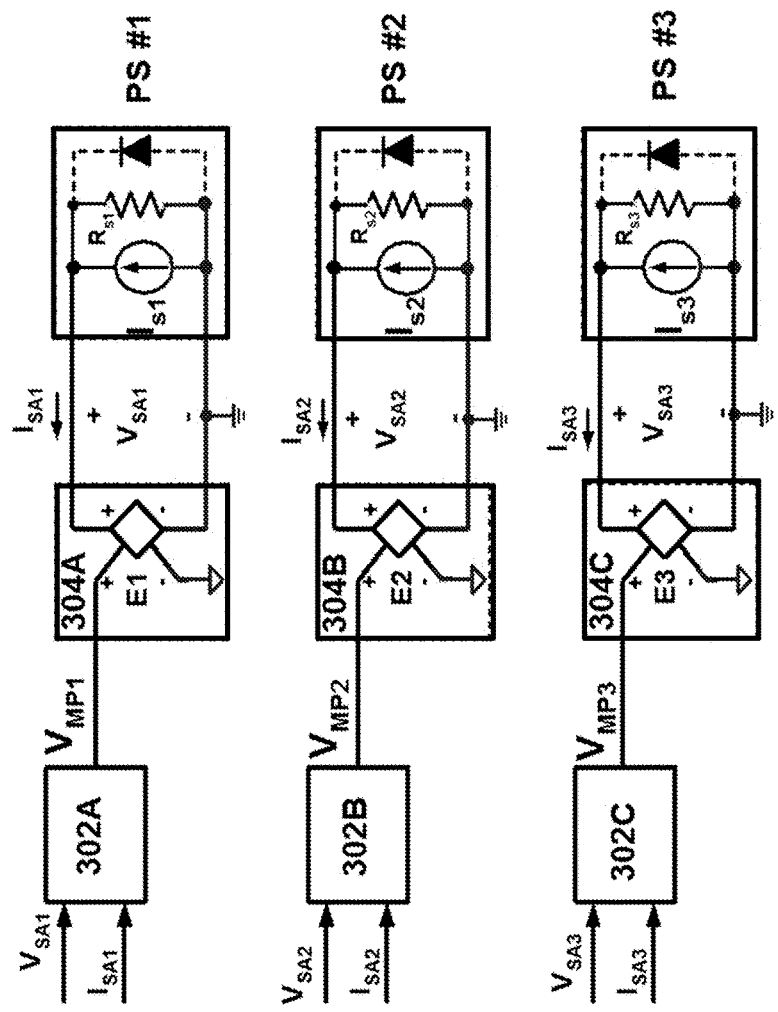
FIG. 3 illustrates a system diagram for an energy harvesting approach using independent maximum power tracking (IMPT) controllers.

For cases having input power sources with similar peak power voltages, the power delivered by the GT-UVD system approaches the ideal peak power obtained by the IMPT approach, as shown in FIG. 3. In FIG. 3, each power source PS#1, PS#2, PS#3 possesses its own IMPT controller 302A, 302B, 302C, respectively. In this example, each MPT controller 302A, 302B, 302C uses a respective converter 304A, 304B, 304C to track the maximum power for each respective power source PS#1, PS#2, PS#3. The IMPT controller enables the ideal peak power to be obtainable as a summation of all available peak powers being extracted from all of the power sources in the system. However, the IMPT configuration shown in FIG. 3 increases complexity, and as a result, increases cost.

Figure 4:
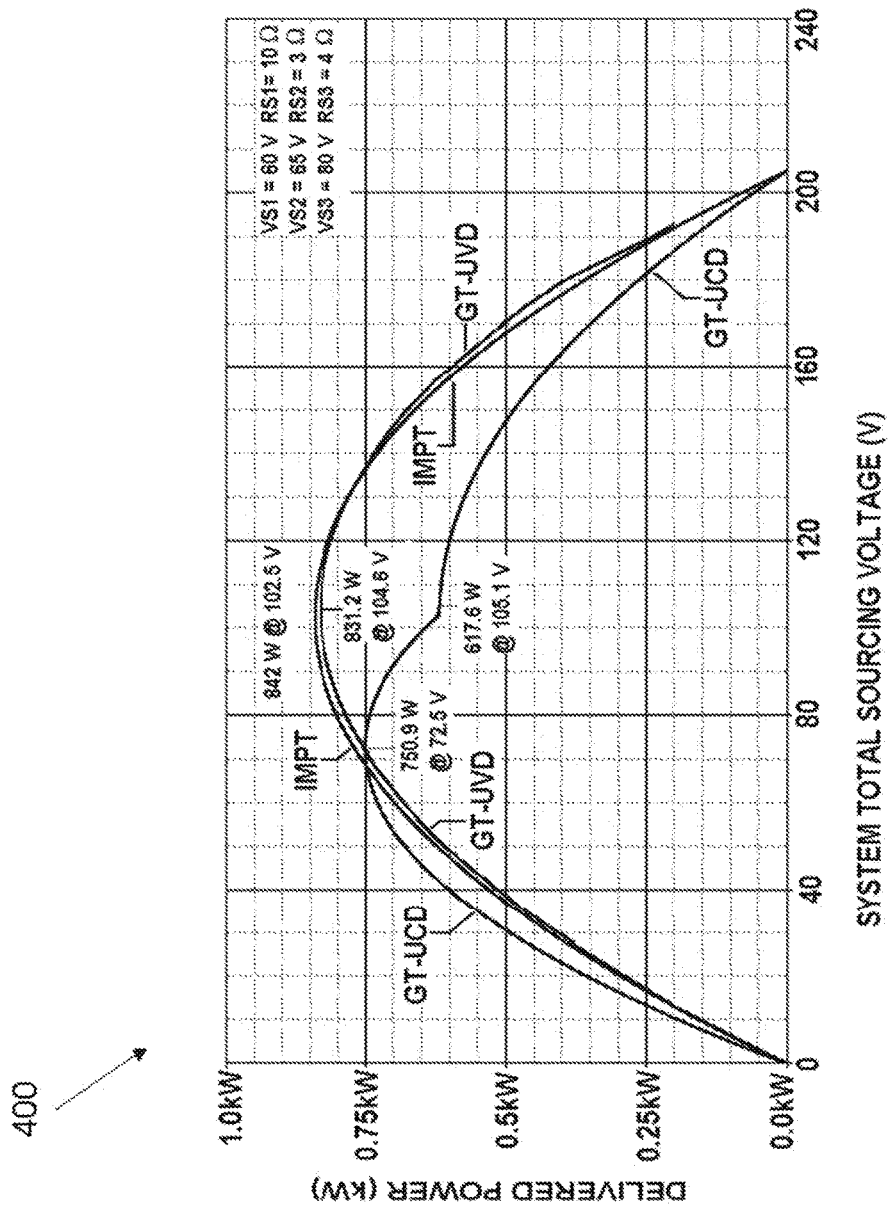
FIG. 4 shows delivered power as a function of the total sourcing voltage.

FIG. 4 shows the delivered power as a function of the total sourcing voltage that is the summation of all distributed voltages across the individual power sources. The three energy-harvesting approaches shown in FIGS. 1-3 are analyzed through computer simulation using $I_{S1}$=6 A, $I_{S2}$=21.67

A, and $I_{S3}$=20 A with $R_{S1}$=10Ω, $R_{S2}$=3Ω, and $R_{S3}$=4Ω, respectively, representing power sources PS#1, PS#2, and PS#3.

The IMPT curve shown in FIG. 4 provides the delivered power when IMPT controllers are distributed to their respective power sources, revealing the highest peak power that is achievable. The delivered power shown in the GT-UVD curve is obtained by the MPT controller of FIG. 2. The MPT controller actively regulates all of the source voltages to be identical. In this example, the delivered peak power through the GT-UVD control (831.2 W) is only 1.23% off from the ideal peak power obtained by the IMPT control (842 W).

The delivered power shown in the GT-UCD curve is accomplished by the GT-UCD approach shown in FIG. 1. In the GT-UCD approach, the three non-identical power sources are terminated with their respective bypassing diodes, equivalently representing three solar array panels that are exposed to different solar illuminations, i.e., due to non-uniform shading or different array-tilting angles facing the sun. However, in this example, the GT-UCD approach can only deliver a peak power of 750.9 W, which is far from the ideal system peak power of 842 W, leading to an unattractive tracking efficiency of 89.1%. Consequently, the three P-V characteristics labeled as IMPT, GT-UVD, and GT-UCD in FIG. 4 serve as comparable examples to recognize potential merits of GT-UVD control.

The GT-UVD approach for distributed power sources results in an economical and simple energy harvesting method through the use of a single MPT controller that can be managed to blend with the existing power and control architectures, whether system outputs are battery-dominated buses or dual-regulated buses. The embodiments of the present invention described below improve the efficiency of the GT-UVD approach shown in FIG. 2 and offer near-maximum power transfer with reduced complexity.

Figure 5:
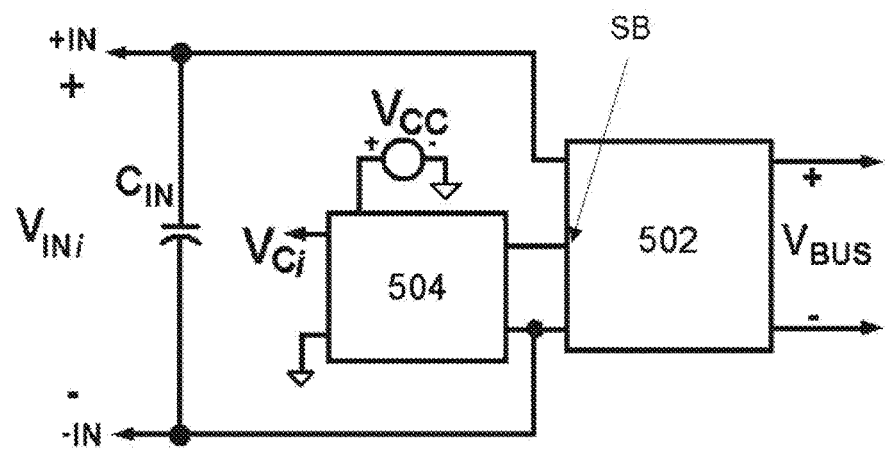
FIG. 5 illustrates a DC-DC converter.

FIG. 5 illustrates a DC-DC converter 500 with an opto-isolated control input $V_{Ci}$, which is electrically isolated from the input power and return terminals of the converter. In FIG. 5, an output-isolated DC-DC converter 502 with an optocoupler circuit 504 is configured to provide electrical isolation to control the power flow of the converter using control input $V_{Ci}$. Many isolated-control converters can have their input power ports individually connected to their respective power sources while the converters are independently controllable through their respective control inputs $V_{Ci}$ and their outputs may be connected in parallel for power delivery to a shared load. In general, each converter's input-power return −IN and the system controller's reference ground may not have the same operating voltage or may not be the same electrical node. Thus, output-isolated DC-DC converter 502 with optocoupler circuit 504 provides flexibilities for interconnection among many converters such that their input power returns do not need to be tied together to the reference ground of the system controller. A voltage at the common collector $V_{CC}$ is utilized to bias a voltage signal of optocoupler circuit 504. An input-filter capacitor $C_{IN}$ of sufficient capacitance is terminated across each converter input for achieving an acceptable AC input-ripple voltage, particularly when the converter input voltage is controlled to meet a certain control objective.

Output-isolated DC-DC converter 502 shown in FIG. 5 can be a single converter power stage or a group of converter power stages that are connected in parallel. These parallel-connected converter power stages of a current-mode type may be preferred. The current-mode converter power stages allow for a common shared-bus SB voltage signal to command the converter power stages in unison to achieve uniform current sharing, and at the same time, serve other control objectives.

Figure 6:
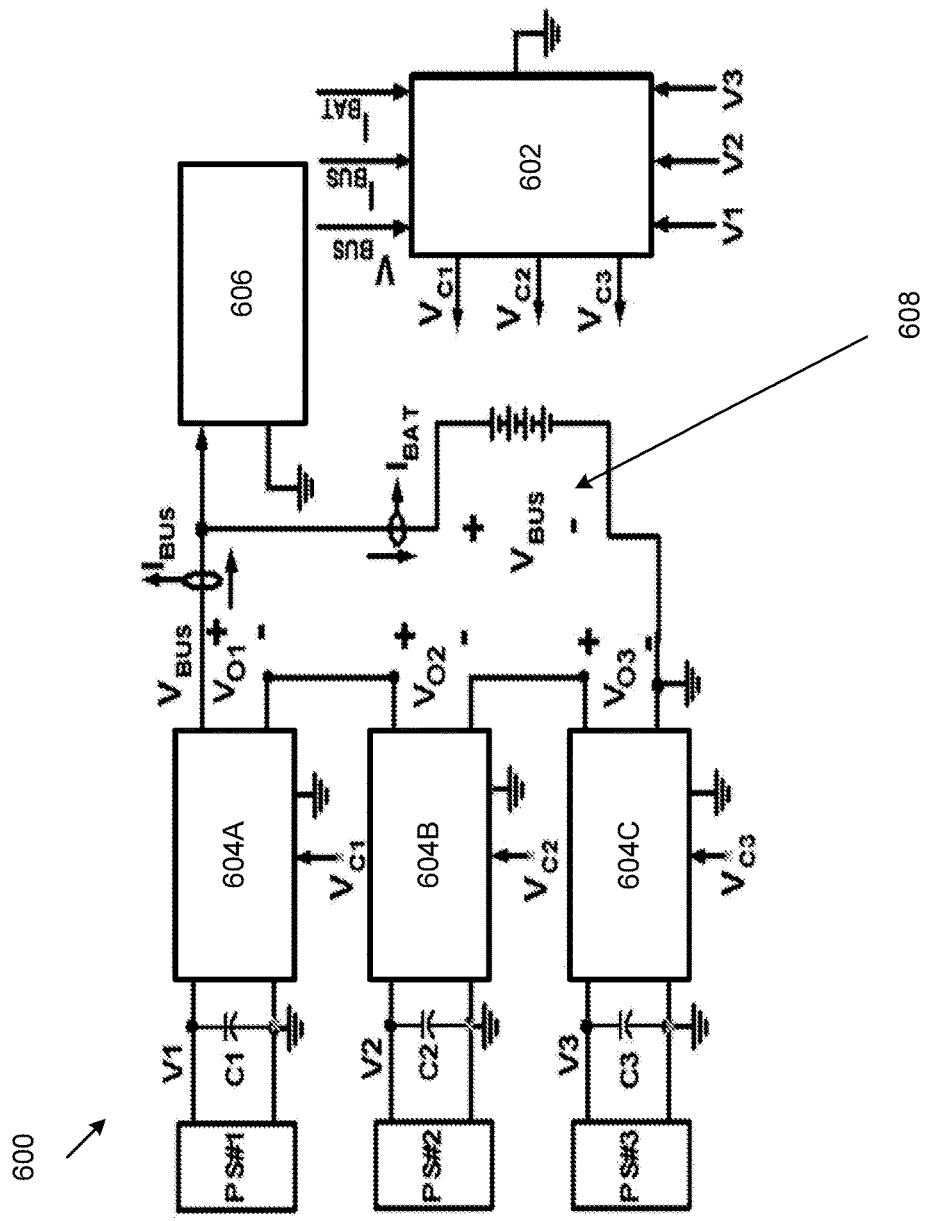
FIG. 6 illustrates a battery dominated power system, according to an embodiment of the present invention.

FIG. 6 illustrates a battery dominated power system 600, according to an embodiment of the present invention. In battery dominated power system 600, a common bus is connected to a battery bank 608. To that end, FIG. 6 illustrates a battery dominated DISO converter power system architecture utilizing three distributed input converters 604A, 604B, 604C with their outputs being series-connected across a battery bank 608 having an output voltage $V_{BUS}$. In certain embodiments, distributed input converters 604A, 604B, 604C include series-connected outputs to form a two-terminal network of series connected voltages across a battery bank. It should be appreciated that the number of converters may depend on the number of power sources (PS#1, PS#2, PS#3, . . . , PS#N) in the system.

A system load 606 may be terminated across the output to become a battery dominated voltage bus. A bus stabilizer network may be terminated across the system output voltage $V_{BUS}$ located as close to the system output port as possible to damp out AC energy, thus ensuring system stability. Each isolated-control DC-DC converter 604A, 604B, 604C shares the following attributes: (1) a shared-bus control input SBi, which allows an external signal to take control of the converter power stage; (2) a number of parallel-connected converter modules configured with shared-bus control inputs tied together to form a common shared-bus control port to achieve nearly uniform current-sharing; (3) operation in a standalone configuration such that the output is regulated at a pre-determined voltage and its shared-bus input is left unconnected; and (4) provision of electrical isolation between input and output. In this embodiment, output-isolated converter 500 shown in FIG. 5 is represented by each of converters 604A, 604B, 604C shown in FIG. 6.

In this embodiment, system controller 602 includes six feedback input signals, e.g., battery bus voltage signal VBUS, system bus current signal $I_{BUS}$, battery bank current signal $I_{BAT}$, and distributed input voltages V1, V2, V3. Each input voltage V1, V2, V3 corresponds to a respective converter 604A, 604B, 604C. Voltages V1, V2, V3 provide system controller 602 with the voltage from the power sources PS#1, PS#2, PS#3. Based on the six feedback input signals, system controller 602 may track power of each power source and transmit control voltage signals $V_{C1}$, $V_{C2}$, $V_{C3}$ to each converter 604A, 604B, 604C to ensure peak performance of each power source PS#1, PS#2, PS#3. For example, based on the input signals, system controller 602 may detect when any of power sources PS#1, PS#2, PS#3 are experiencing a reduction in power. To ensure that each of power sources PS#1, PS#2, PS#3 act as a power provider and not a dissipater, system controller 602 transmits a voltage control signal to either each converter 604A, 604B, 604C or to one of converters 604A, 604B, 604C connected to the power source that is experiencing a reduction in power.

Also, in this embodiment, capacitors C1, C2, C3 are terminated across respective distributed power sources PS#1, PS#2, PS#3 or across respective inputs of the converters 604A, 604B, 604C. Capacitors C1, C2, C3 are configured to provide sufficient filtering of distributed currents drawn by converters 604A, 604B, 604C such that the currents drawn from respective power sources PS#1, PS#2, PS#3 have negligible AC content at the converter switching frequency. Since distributed power sources PS#1, PS#2, PS#3 possess non-zero sourcing impedances, each capacitor C1, C2, C3 and each associated sourcing impedance form a low-pass filtering network across the respective converter input. Such an inherent low-pass filter contributes to negligible AC switching-ripple voltage superimposed on the associated sourcing voltage, producing better signal-to-noise ratio and allowing the MPT control to effectively search for the peak power voltages across distributed power sources PS#1, PS#2, PS#3.

Figure 7:
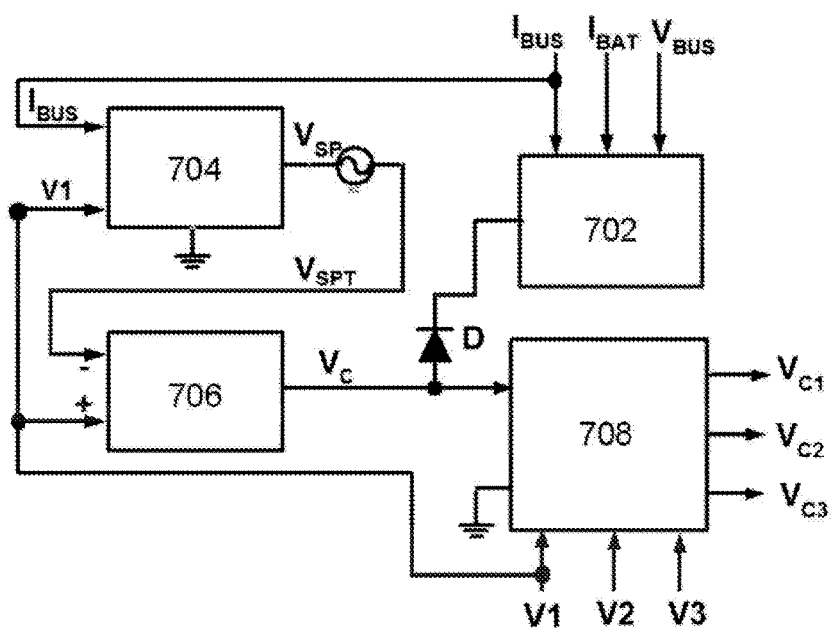
FIG. 7 illustrates a system controller, according to an embodiment of the present invention.

FIG. 7 illustrates a system controller 700, according to an embodiment of the present invention. It should be appreciated that system controller 700 shown in FIG. 7 may be employed in battery dominated power system 600 of FIG. 6 in some embodiments.

In this embodiment, system controller 700 provides at least four basic control functions. First, system controller 700 can control the system battery charge via a battery charge controller 702. Second, system controller 700 can perform system distributed input-voltage regulation via an input voltage regulator 706. Third, system controller 700 can perform uniform input voltage distribution via a UIVD controller 708. Fourth, system controller 700 can perform system maximum power tracking via MPT controller 704. This embodiment also includes a bus stabilizer network terminated across the system output $V_{BUS}$ located as close to the system output port as possible to damp out AC energy, thus ensuring system stability.

In this embodiment, battery charge controller 702 is configured to regulate battery bus voltage signal $V_{BUS}$ to a preset value in accordance with its voltage-temperature (V/T) profile to prevent a battery or battery bank, such as the one shown in FIG. 6, from overcharging. When battery bus voltage signal VBUS falls below a preset value that is pre-assigned as a function of temperature, battery-bank current signal $I_{BAT}$ may be regulated at a preset charge-current set point determined by battery charge controller 702. Active battery regulation of either battery bus voltage signal $V_{BUS}$ or battery bank current signal $I_{BAT}$ causes a forward-voltage bias across pull-down diode D.

In this embodiment, when battery bus voltage signal $V_{BUS}$ and battery bank current signal $I_{BAT}$ are respectively below the preset voltage value and the preset charge-current set point, system controller 700 may regulate the system distributed-input voltage V1 at the optimum peak power voltage that is determined by MPT controller 704. For example, MPT controller 704 may receive a system bus current signal $I_{BUS}$ and an optimum peak power voltage V1 to generate a commanding set point voltage signal $V_{SPT}$ that includes a set point reference voltage signal $V_{SP}$.

It should be appreciated that as long as operating battery bus voltage signal $V_{BUS}$ and battery bank current signal $I_{BAT}$ are below their preset voltage/charge-current values, the DISO converter power system shown in FIG. 6 may be controlled to have an optimum power transfer from all distributed power sources by utilizing a single MPT controller 704 that dominates its control over battery charge controller 702 through a primary control voltage signal $V_C$ and the reverse-biased diode D.

One of the following three operational modes may be active at a time in some embodiments—battery voltage regulation for compliance with a V/T profile, battery charge-current regulation for serving a commanding charge rate, or distributed-input voltage regulation (IVR) for tracking a system optimum-power voltage. Uniform voltage distribution among converter-input voltages delivered by all distributed power sources is actively regulated at all times by UIVD controller 708. During any of these three operating modes, converter-input voltages V1, V2, V3 across the distributed power sources PS#1, PS#2, PS#3 are regulated to be equal by UIVD controller 708. UIVD controller 708 is configured to distribute, in this embodiment, three voltage control signals $V_{C1}$, $V_{C2}$, $V_{C3}$ to their respective isolated-control converters 604A, 604B, 604C.

Figure 8:
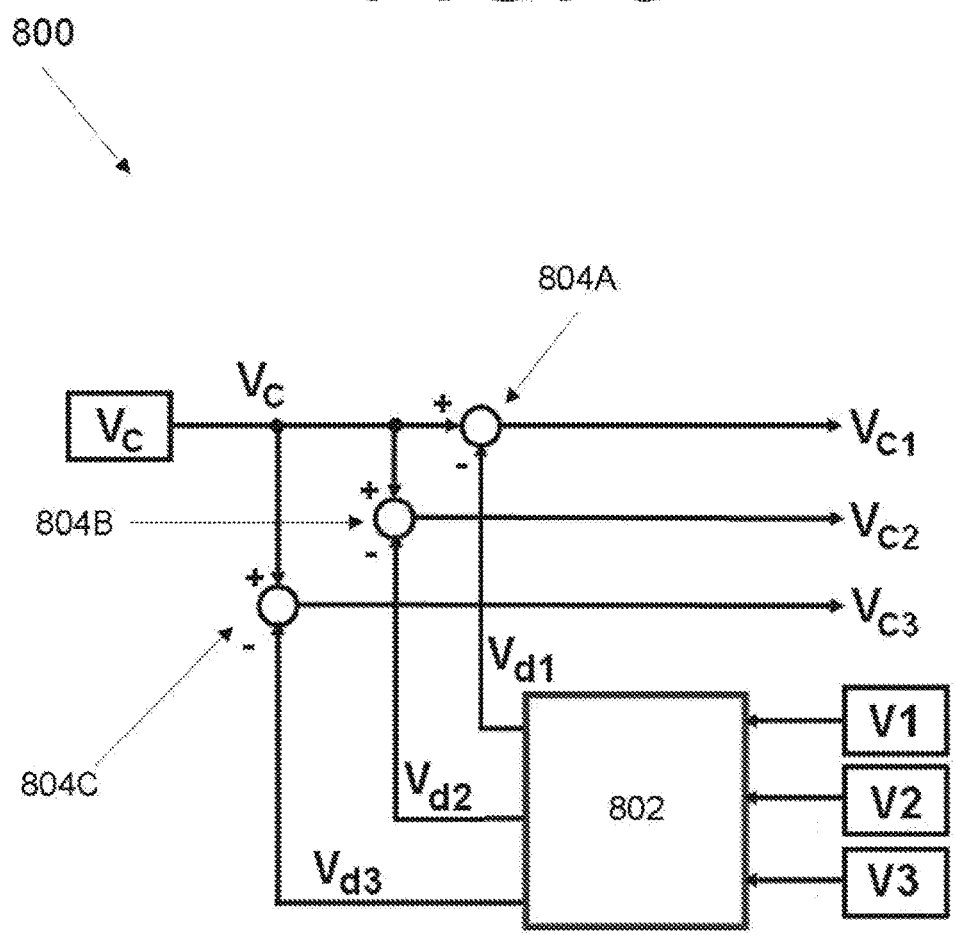
FIG. 8 illustrates a uniform input voltage distribution (UIVD) controller for three series connected converters, according to an embodiment of the present invention.

FIG. 8 illustrates a UIVD controller 800 for three series connected converters, according to an embodiment of the present invention. It should be appreciated that a DISO power system may include N isolated-control DC-DC converters with their respective N distributed power sources PS#1, PS#2, . . . , PS#N.

During battery voltage and/or current regulation, or during the distributed input voltage regulation, input voltage distribution controller 802 may produce secondary voltage control signals ($V_{d1}$, $V_{d2}$, . . . , $V_{dN}$). The number of secondary voltage control signals depends upon the number of converters in the DIPO power system. In this embodiment, controller 802 produces or generates three secondary voltage control signals $V_{d1}$, $V_{d2}$, $V_{d3}$ based on at least voltage signals V1, V2, V3. Determination of secondary voltage control signals $V_{d1}$, $V_{d2}$, $V_{d3}$ is discussed with respect to FIGS. 9 and 10. Secondary voltage control signals $V_{d1}$, $V_{d2}$, $V_{d3}$ may be subtracted from the voltage control signal $V_C$ at nodes 804A, 804B, 804C to create modified control voltages $V_{C1}$, $V_{C2}$, $V_{C3}$ to regulate the respective converter to accomplish uniform input voltage distribution.

Figure 9:
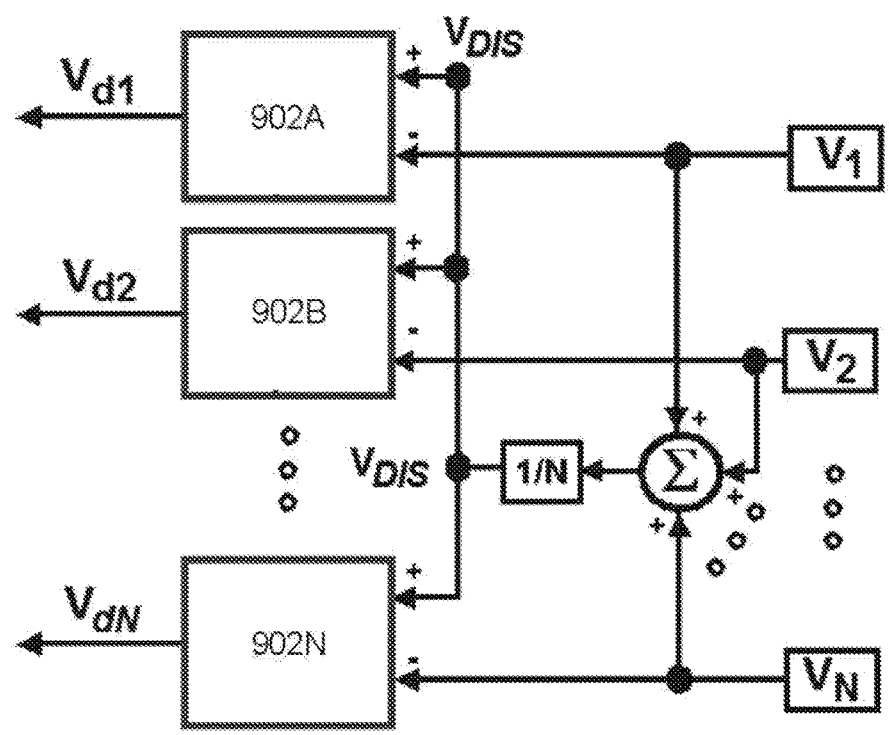
FIG. 9 illustrates a central-limit UIVD controller, according to an embodiment of the present invention.

FIG. 9 illustrates a central-limit UIVD controller 900, according to an embodiment of the present invention. In FIG. 9, a common distributed voltage reference signal $V_{DIS}=V_1/N$ may be generated as a central-limit (CL) distribution reference. In this case, N=3 for the number of distributed converters, but N may change based on the number of distributed converters in the given architecture.

Each voltage distribution error amplifier 902A-C is configured to amplify the voltage difference between a common distributed voltage reference signal $V_{DIS}$ and each converter-input voltage $V_1$, $V_2$, $V_3$. Each voltage distribution error amplifier 902A-C is further configured to compensate for the frequency and generate a voltage distribution control signal ($V_{d1}$, $V_{d2}$, $V_{d3}$) for each converter. Each voltage distribution control signal $V_{di}$ is configured to provide a minor control correction to voltage control signal $V_C$, thus ensuring uniform input voltage distribution.

However, it should be appreciated that UIVD controller 900 may not be fault-tolerant when the common distributed voltage reference signal $V_{DIS}=V_1/N$ is the central-limit (CL) distribution reference. For example, if a single converter fails and cannot be controlled due to a short circuit across its input, the system may lose regulation.

Figure 10:
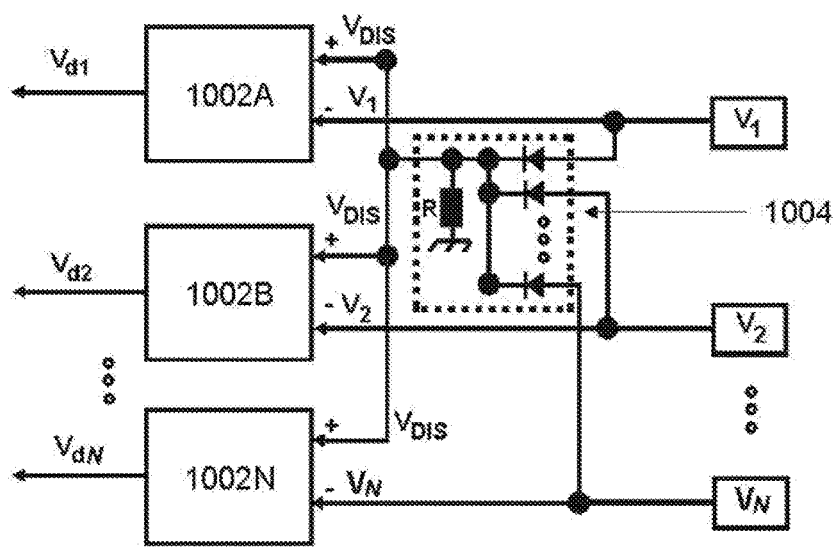
FIG. 10 illustrates a fault-tolerant UIVD controller using a Maximum-Limit (ML) distribution reference, according to an embodiment of the present invention.

To overcome such issues, FIG. 10 illustrates a fault-tolerant UIVD controller 1000 using a maximum limit (ML) distribution reference, according to an embodiment of the present invention. For example, FIG. 10 shows a UIVD controller 1000 having voltage distribution error amplifiers 1002A-N that are based on the ML distribution reference $V_{DIS}=MAX(V_1, V_2, \ldots, V_N)$. To achieve fault-tolerance, a set of ideal rectifiers 1004 is included as part of UIVD controller 1000 to produce a common distributed voltage reference signal $V_{DIS}$, which is the highest converter-input voltage obtained from one of the distributed converters within the power system. In other words, $V_{DIS}$ is the maximum limit selection candidate. Common distributed voltage reference signal $V_{DIS}$ corresponds to the sourcing input voltage of the strongest power source among N distributed power sources, wherein the strongest power source provides the highest power among distributed powers delivered by the N power sources.

Using such a configuration, if a converter fails due to an input short circuit, common distributed voltage reference signal $V_{DIS}$ may be automatically updated to compensate for the loss of a failed converter or the failure of its respective input power source. For the system to tolerate at least one converter input short circuit failure, two ideal rectifiers may be required to sense the output voltage from any two converters. Up to N ideal rectifiers may be included in UIVD controller 1000 for an N-converter DISO system for tolerance up to N−1 power source failures.

In this embodiment, FIG. 10 illustrates UIVD controller 1000 for a three-converter DISO power system with fault-tolerance. A common distributed voltage reference signal $V_{DIS}$ may be derived from N cathode-parallel-connected ideal rectifiers 1004 to individually sense the input voltages of converters, e.g., converters 604A, 604B, 604C of FIG. 6. For example, if one converter fails to build up its input voltage, the N−1 remaining converters will be controlled to have uniform input voltage distribution. A protection fuse may be inserted in series with either the positive input of each DISO converter or the positive output of its respective power source provides a simple method of fault clearing to prevent thermal overstress on the power system.

Furthermore, the DC gain for each voltage distribution error amplifier 1002A, 1002B, ..., 1002N does not need to be too high in order to achieve uniform input voltage distribution. To the contrary, excessive DC gain within each distribution error amplifier 1002A, 1002B, ..., 1002N causes UIVD controller 1000 to dominate the battery charge control and the distributed-input voltage regulation modes of operation, resulting in insufficient charging to the battery bank.

Figure 11:
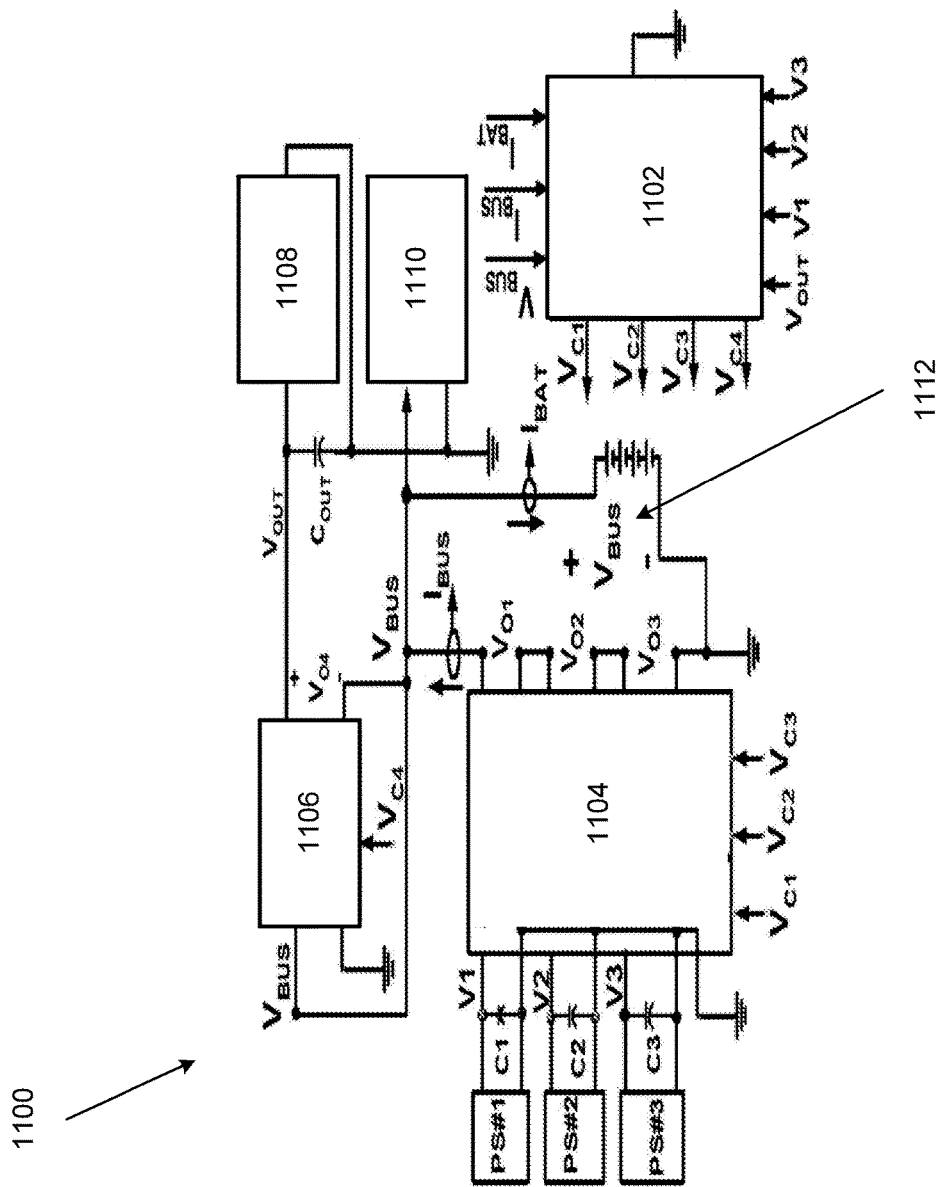
FIG. 11 illustrates a dual-regulated bus power system with UIVD control, according to an embodiment of the present invention.

FIG. 11 illustrates a dual-regulated bus power system 1100 with UIVD control, according to an embodiment of the present invention. In this embodiment, dual-regulated bus power system 1100 includes a 3-channel DISO converter power system 1104. 3-channel DISO converter power system 1104 includes three independently sourced input converters (not shown), each converter having outputs that are series-connected across a battery bank 1112. Battery bank 1112 has a battery bus output voltage VBUS. A system load 1110 may be terminated across output voltage VBUS to become a battery dominated voltage bus.

Similar to capacitors C1, C2, C3 of FIG. 6, capacitors C1, C2, C3 shown in FIG. 11 are terminated across respective distributed power sources PS#1, PS#2, PS#3 or across respective inputs of 3-channel DISO converter power system 1104. Capacitors C1, C2, C3 are configured to provide sufficient filtering of distributed currents drawn by 3-channel DISO converter power system 1104 such that the currents drawn from their respective power sources PS#1, PS#2, PS#3 have negligible AC content at the converter switching frequency. Since distributed power sources PS#1, PS#2, PS#3 possess non-zero sourcing impedances, each capacitor C1, C2, C3 and each associated sourcing impedance form a low-pass filtering network across the respective converter input. Such an inherent low-pass filter contributes to negligible AC switching-ripple voltage superimposed on the associated sourcing voltage, producing better signal-to-noise ratio and allowing the MPT control to effectively search for the peak power voltages across distributed power sources PS#1, PS#2, PS#3.

Bus load 1108 may be terminated across a regulated bus voltage signal $V_{OUT}$. Bus load 1108 may be a single load or a group of load circuits that can share the same bus voltage signal $V_{OUT}$. Load characteristics may include a resistive load, a constant current-sink, a constant-power load, or a combination of one or more load types. As long as bus load 1108 is compatible with a regulated bus sourcing impedance (i.e., the sourcing impedance exhibits a lower magnitude than a load impedance), a closed loop control for regulated bus voltage signal $V_{OUT}$ can robustly regulate bus voltage signal $V_{OUT}$ without any instability. Since bus load 1108 may include various load types that require tight voltage regulation, regulated bus voltage signal $V_{OUT}$ enables more types of load to draw power off of bus load 1108.

Each independently sourced input converter may share the same four attributes as previously described in relation to FIG. 6. In this embodiment, however, system controller 1102 has seven feedback input signals: a battery bus voltage signal $V_{BUS}$, a regulated bus output voltage signal $V_{OUT}$, a system battery bus current signal $I_{BUS}$, a charging battery bank current signal $I_{BAT}$, and distributed input voltages V1, V2, V3 from the three independently sourced input converters, or from 3-channel DISO converter power system 1104. System controller 1102 can provide system voltage regulation of bus output voltage signal $V_{OUT}$. System controller 1102 can also provide battery charge control. Further, system controller 1102 can provide system distributed-input voltage regulation, as well as uniform input voltage distribution. Additionally, system controller 1102 can provide system maximum power tracking.

A bus stabilizer network may be terminated across the regulated bus output voltage signal $V_{OUT}$ located as close to the system output port as possible to damp out AC energy, thus ensuring system stability. Regulated bus output voltage signal $V_{OUT}$ is on a closed-loop and controlled by an output isolated DC-DC converter 1106 with its output port $V_{O4}$ that is series-connected with battery bus voltage $V_{BUS}$. The output-series-connected converter significantly improves the system efficiency since output voltage signal $V_{O4}$ can be a minor portion of the overall output voltage signal $V_{OUT}$ and battery voltage signal $V_{BUS}$ can be the major portion. Voltage control signal $V_{C4}$ may drive the power stage of output isolated DC-DC converter 1106 to regulate the output voltage $V_{OUT}$ at a fixed value above the system battery-bus voltage $V_{BUS}$.

Figure 12:
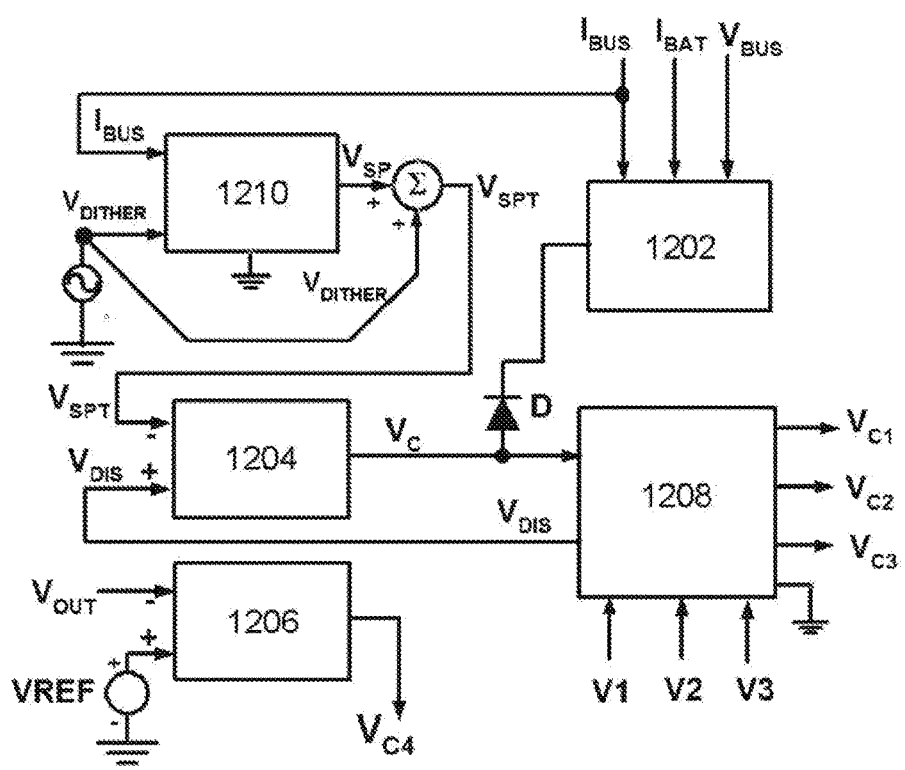
FIG. 12 illustrates a system controller for the dual regulated bus power system shown in FIG. 11, according to an embodiment of the present invention.

FIG. 12 illustrates a system controller 1200 for the dual regulated bus power system 1100 shown in FIG. 11, according to an embodiment of the present invention. System controller 1200 generally provides more fault-tolerant coverage than system controller 700 of FIG. 7. In this embodiment, MPT controller 1210 receives a system battery bus current signal $I_{BUS}$ and a dither voltage signal $V_{DITHER}$ and generates a set point reference voltage signal $V_{SP}$. The summation of the dither voltage signal $V_{DITHER}$ and set point reference signal $V_{SP}$ may generate a commanding set point voltage signal $V_{SPT}$ for regulation of the common distributed voltage reference signal $V_{DIS}$.

Like battery charge controller 702, battery charge controller 1202 may have a similar function in this embodiment. Similarly, UIVD controller 1208 may have similar functionality as UIVD controller 708. Unlike in FIG. 7, input voltage regulator 1204 receives a common distributed voltage reference signal $V_{DIS}$ as its feedback input instead of voltage V1 from PS#1. Since common distributed voltage reference signal $V_{DIS}$ is the maximum-limit voltage, i.e., the maximum voltage detected from power sources or $V_{DIS}$=MAX(V1, V2, ..., VN), input voltage regulator 1204 can provide an active control on the common distributed voltage reference signal $V_{DIS}$ to follow a commanding set point voltage $V_{SPT}$. In this embodiment, there will always be an input voltage from one converter that is the highest among all of the distributed-input voltages while they are controlled to have a uniform distribution at all times. This maximum-limit input voltage regulation allows the converter power system to tolerate more than one failure due to short circuit or open circuit of power sources, as well as short circuit or overload across distributed inputs of DISO converters.

Also, in this embodiment, system control 1200 includes an output voltage regulator 1206 that generates a control voltage signal $V_{C4}$ to be transmitted to an output isolated DC-DC converter 1106 shown in FIG. 11. Control voltage signal $V_{C4}$ may regulate system output voltage signal $V_{OUT}$. Control voltage signal $V_{C4}$ is the amplified frequency-compensated error signal that is proportional to the difference between reference voltage signal $V_{REF}$ and system output voltage signal $V_{OUT}$. As control voltage signal $V_{C4}$ increases, output isolated DC-DC converter 1106 absorbs more input current drawn from the battery voltage signal $V_{BUS}$ to provide sufficient output voltage $V_{O4}$ so that system output voltage signal $V_{OUT}$ is tightly regulated to the target value corresponding to the voltage reference signal $V_{REF}$. In this manner, output voltage regulator 1206 can be an operational amplifier (OP-AMP) analog circuit that serves as an error-voltage amplifier that accepts two inputs, system output voltage signal $V_{OUT}$ and voltage reference signal $V_{REF}$, and delivers one output control voltage signal $V_{C4}$.

Figure 13:
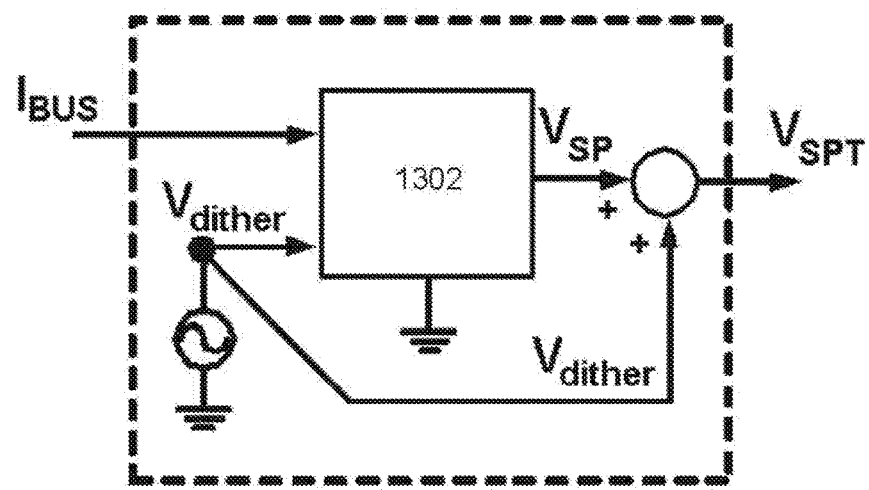
FIG. 13 illustrates a streamlined MPT controller, according to an embodiment of the present invention.

FIG. 13 illustrates a streamlined MPT controller 1300, according to an embodiment of the present invention. In this embodiment, MPT processing circuit 1302 receives and processes two signals—total system battery bus current signal $I_{BUS}$ and AC dither signal $V_{DITHER}$ having a low frequency. MPT processing circuit 1302 generates a commanding set point voltage signal $V_{SPT}$ that includes a set point reference voltage signal $V_{SP}$ and the AC dither signal $V_{DITHER}$. It should be appreciated that streamlined MPT controller 1300 has a single feedback input, e.g., the total system battery bus current signal $I_{BUS}$. This embodiment does not require additional feedback inputs, such as a feedback input for voltage V1.

Figure 14:
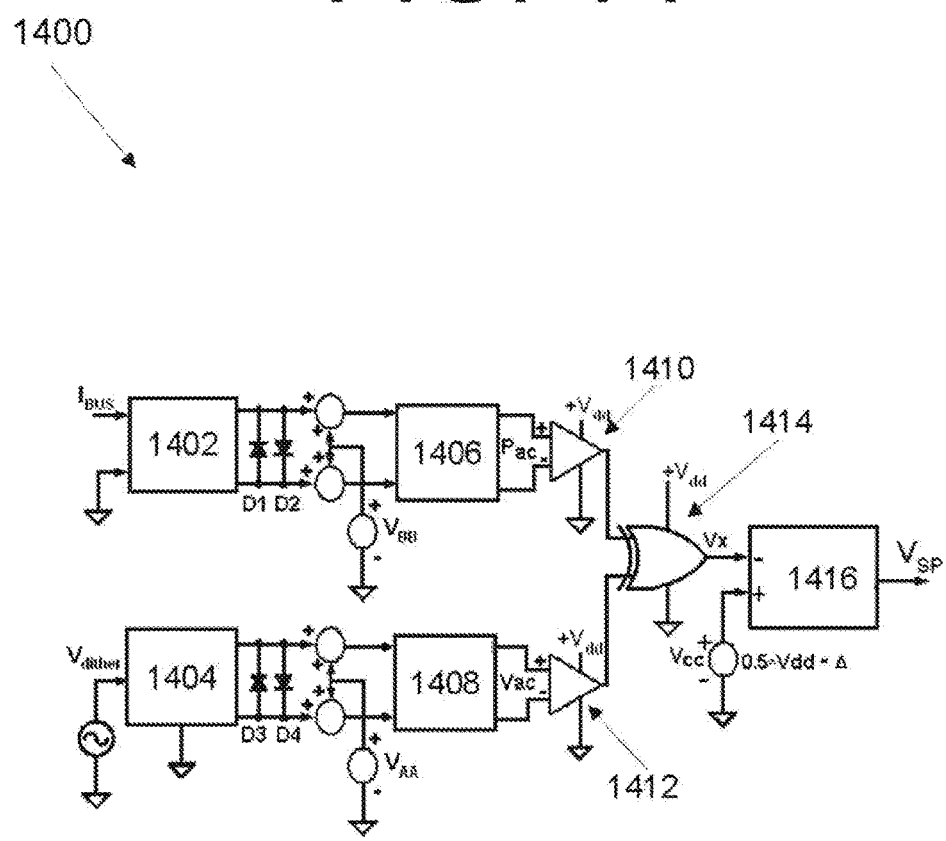
FIG. 14 is a block diagram illustrating the MPT processing controller of FIG. 13, according to an embodiment of the present invention.

FIG. 14 is a block diagram illustrating a MPT processing circuit 1400 similar to that shown in FIG. 13, according to an embodiment of the present invention. In this embodiment, the main feedback signal for MPT processing circuit 1400 is total system battery current signal $I_{BUS}$ of the entire converter power system that is controlled to provide a maximum output current. Front-end differential-mode high-pass filter (HPF) 1402 removes the DC content from the total system battery current signal $I_{BUS}$ and provides a differential-mode AC output signal across voltage-limiting diodes D1 and D2. The high-pass-filtered AC current signal is then biased with a common-mode voltage and a low-pass filter (LPF) 1406 to remove high-frequency noise. In this manner, cascaded differential-mode HPF 1402 and LPF 1406 stages produce a band-limited AC power signal $P_{ac}$ that is proportional to the incremental power delivered by the solar array source. Subsequently, a voltage comparator circuit 1410 converts $P_{ac}$ into a logical voltage signal.

Simultaneously, in a parallel path, differential-mode HPF 1404 and LPF 1408 stages extract an AC voltage signal $V_{ac}$ from the dither voltage signal $V_{DITHER}$ that is also converted into another logical voltage signal through voltage comparator circuit 1412. The filtered AC dither signal $V_{ac}$ may be in-phase with the solar array dither voltage. Incremental power signal $P_{ac}$ and AC dither voltage signal $V_{ac}$ may be processed through an exclusive OR (XOR) gate 1414 to decode their phase relationship $V_x$. Depending on the phase shift between the power signal $P_{ac}$ and dither voltage signal $V_{ac}$, the DC value of voltage signal $V_x$ may drift from its idle DC value, usually set to 50 percent of the supplying voltage to XOR gate 1414. The deviation of the voltage signal's $V_x$ average voltage from its idle DC value can cause downstream voltage integrator circuit 1416 to slowly update the set point reference output signal $V_{SP}$ toward a value corresponding to the peak-power voltage $V_{mp}$, of the solar array.

To ensure a proper idle state of MPT processing circuit 1400, the reference voltage feeding the positive input of voltage integrator 1416 may be slightly reduced by a small value Δ, such that the idle state of the set point reference voltage signal $V_{SP}$ corresponds to the array voltage just below the array peak-power voltage. This causes streamlined MPT controller 1300 to stay in an idle state and be triggered for active maximum power tracking when the solar array voltage reduces to the idle set point voltage $V_{SPMIN}$.

Figure 21:
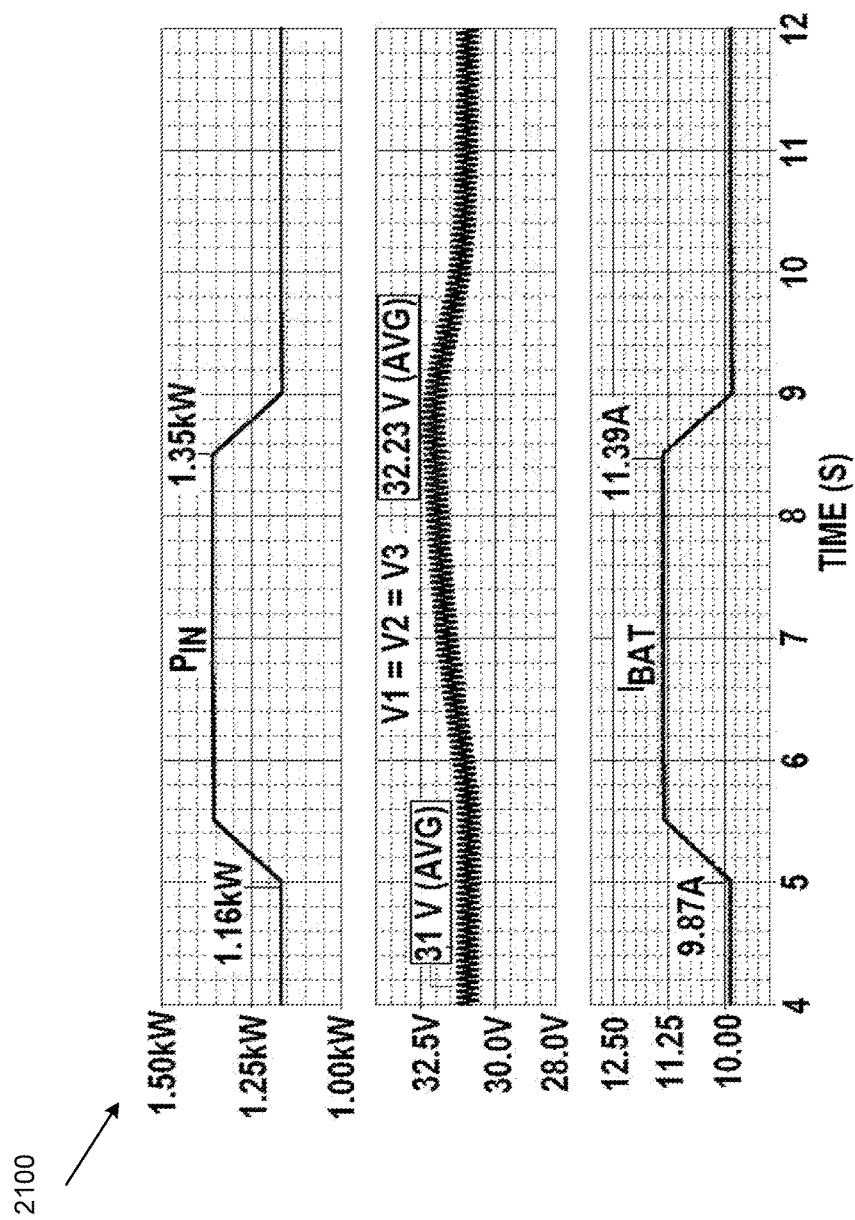
FIG. 21 is a graph illustrating simulated peak-power voltages of the battery dominated power system of FIG. 6, according to an embodiment of the present invention.

When the DISO converter power system is controlled under the MPT mode of operation in some embodiments, a transient response of distributed sourcing input voltage V1 is simulated to verify a stable transition during two simultaneous step changes of power source PS#1 open-circuit voltage from 60 V to 80 V and power source PS#3 open-circuit voltage from 60 V to 50 V at time t=5 s. As shown in the middle of graph 2100 of FIG. 21, three operating sourcing voltages V1, V2, V3 are 31 V before t=5 s and 32.23 V after t=8.5 s. This shows that operating sourcing voltages V1, V2, V3 are nearly the same as the ideal peak-power voltages of 30 V and 32.04 V depicted in FIG. 21. In other words, graph 2100 shows that MPT controller 1300 tracks the group peak power using the UIVD approach. As a consequence, the battery charge current $I_{BAT}$ increases from 9.8 A to 11.39 A, as shown in the bottom plot of FIG. 21. This reveals a power increase of 136.8 W, which is absorbed by the 90 V battery. As compared to theoretical P-V characteristics shown in FIG. 17, the two tracked peak powers of 1.16 kW and 1.35 kW shown in the top plot of FIG. 21 are respectively at 99.1% and 99.5% tracking efficiency.

Figure 15:
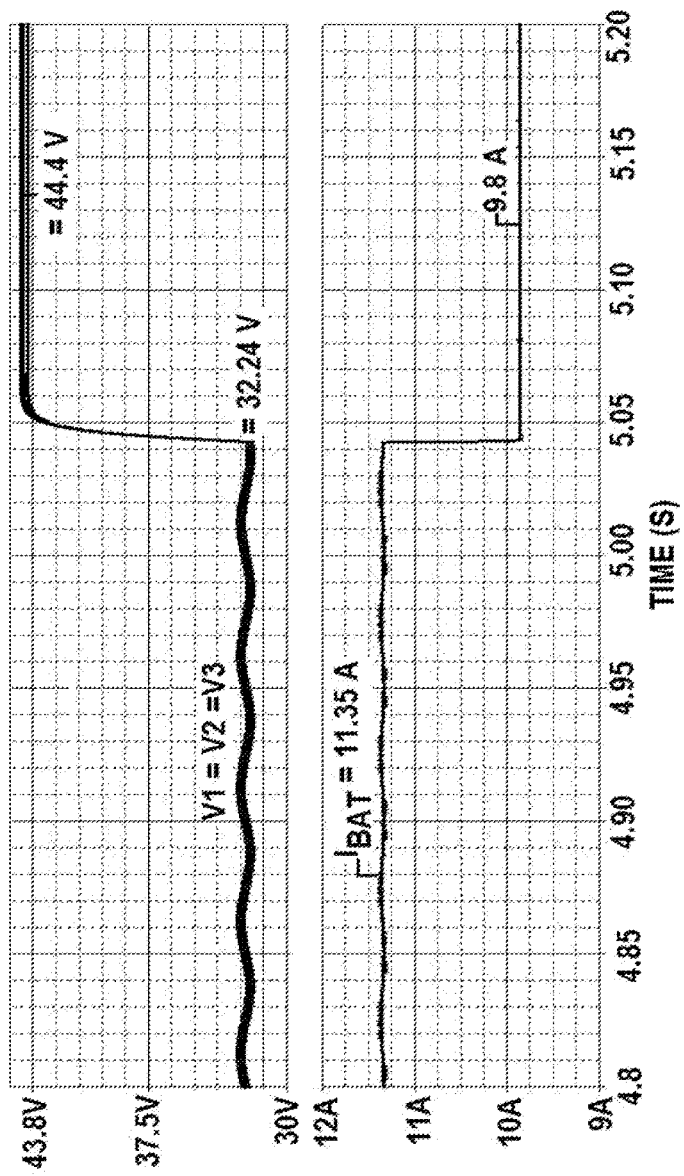
FIG. 15 is a graph illustrating a simulated response of the battery dominated power system of FIG. 6, according to an embodiment of the present invention.

FIG. 15 is a graph 1500 illustrating a simulated response of battery dominated power system 600 of FIG. 6, according to an embodiment of the present invention. In this embodiment, graph 1500 illustrates a simulated response of battery dominated power system 600 during both input voltage regulation with GT-UVD and battery-charge current regulation modes of operation and their transient transition. The simulation result demonstrates a mode transition from an input-voltage regulation mode to a normal battery-charge current regulation mode. During the mode transition, the charge-current set point reference is reduced from above 12 A to about 9.8 A at time t=5.04 s. This change of the set point reference command causes the battery current $I_{BAT}$ to drop from 11.3 A to 9.8 A (see the lower plot of FIG. 15) and the distributed sourcing voltages V1, V2, V3 to increase from 32.24 V to 44.4 V (see the upper plot of FIG. 15).

During both modes of operation in steady state and their transient mode transitions, the three distributed sourcing voltages V1, V2, V3 are controlled across the individual inputs of three respective converters to have uniform distribution at all times, as shown in the three overlapping traces of the upper plot in FIG. 15. The MPT controller is active during the input-voltage regulation mode. Thus, all of the sourcing voltages contain a 20 Hz sinusoidal voltage $V_{DITHER}$ that provides a continuous perturbation to all sourcing voltages and subsequently produces a 20 Hz response that is superimposed on the total system battery current signal $I_{BUS}$.

FIG. 15 also shows that the 20-Hz frequency component within total system battery bus current signal $I_{BUS}$ is extracted and processed by the MPT controller to update the set point reference voltage signal $V_{SP}$. The commanding set point voltage signal $V_{SPT}$, including set point reference voltage signal $V_{SP}$ and a small-amplitude dither voltage signal $V_{DITHER}$, serves as the commanding voltage signal for regulation of the feedback voltage signal $V_{DIS}$. In some embodiments, feedback voltage signal $V_{DIS}$ is the maximum-limit distribution reference, as shown in FIG. 10.

Figure 16:
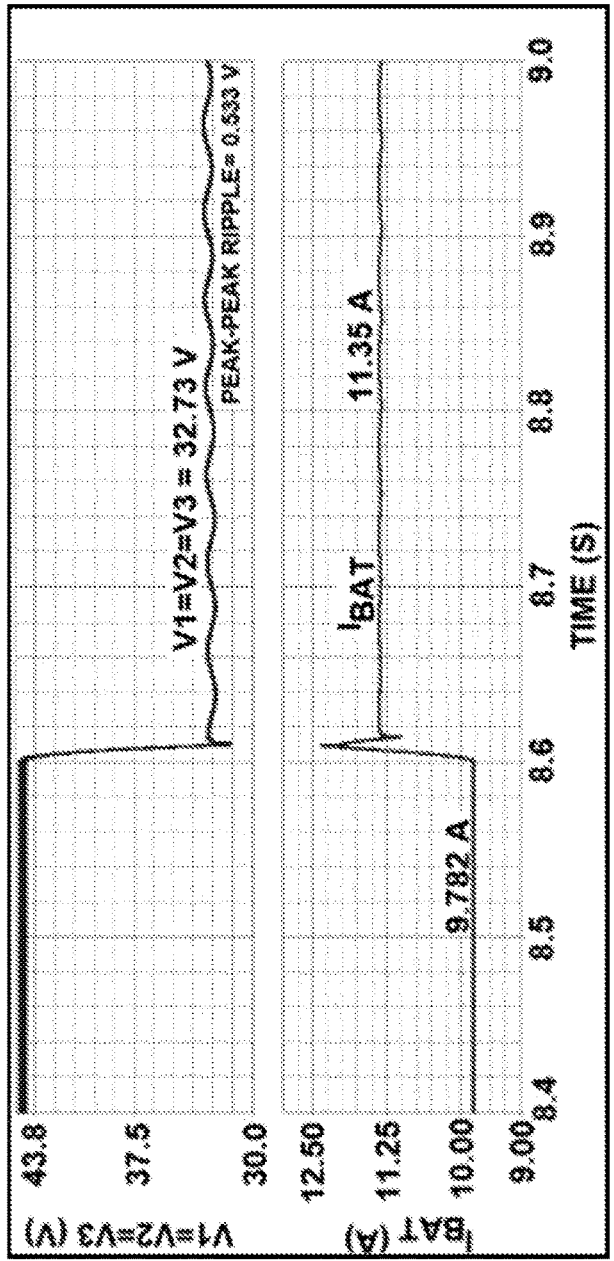
FIG. 16 is another graph illustrating a simulated response of the battery dominated power system of FIG. 6, according to an embodiment of the present invention.

FIG. 16 is another graph 1600 illustrating a simulated response of the battery dominated power system 600 of FIG. 6, according to an embodiment of the present invention. Graph 1600 shows a simulated response of battery dominated power system (or three-converter DISO power system) 600 during an input-voltage regulation with GT-UVD and battery-charge current regulation modes of operation and their transient transition.

For example, the simulation result shown in FIG. 16 reveals a transition from the battery charge current regulation mode to the input voltage regulation mode. Three sourcing input voltages V1, V2, V3 shown in the middle plot are all regulated at a commanding set point voltage signal $V_{SPT}$, i.e., autonomously updated to approach a voltage corresponding to the system peak power voltage of 32.5 V (and eventually to 32.24 V) with 0.5 V peak-to-peak dither voltage ripple. The change in the operation mode occurs as a result of a step-change in the commanding charge-current reference signal from 0.1 V (corresponding to 10-A charge-current) to 0.5 V (corresponding to 50-A charge current), as shown in the top plot of FIG. 16. The increased charger command causes diode D of FIG. 7 to be reverse-biased since input voltage regulator 706 has entered its active linear region to prevent the system input voltages V1, V2, V3 from collapsing below their existing commanding set point voltage $V_{SPT}$. The maximum power tracking operation, e.g., MPT controller 704, takes over the battery charge current regulation since the available system peak power cannot deliver enough current to charge the battery at the 50 A current corresponding to the 0.5 V commanding charge-current reference signal. Consequently, battery current $I_{BAT}$ is saturated at 11.35 A as shown in the bottom plot of FIG. 16.

Figure 17:
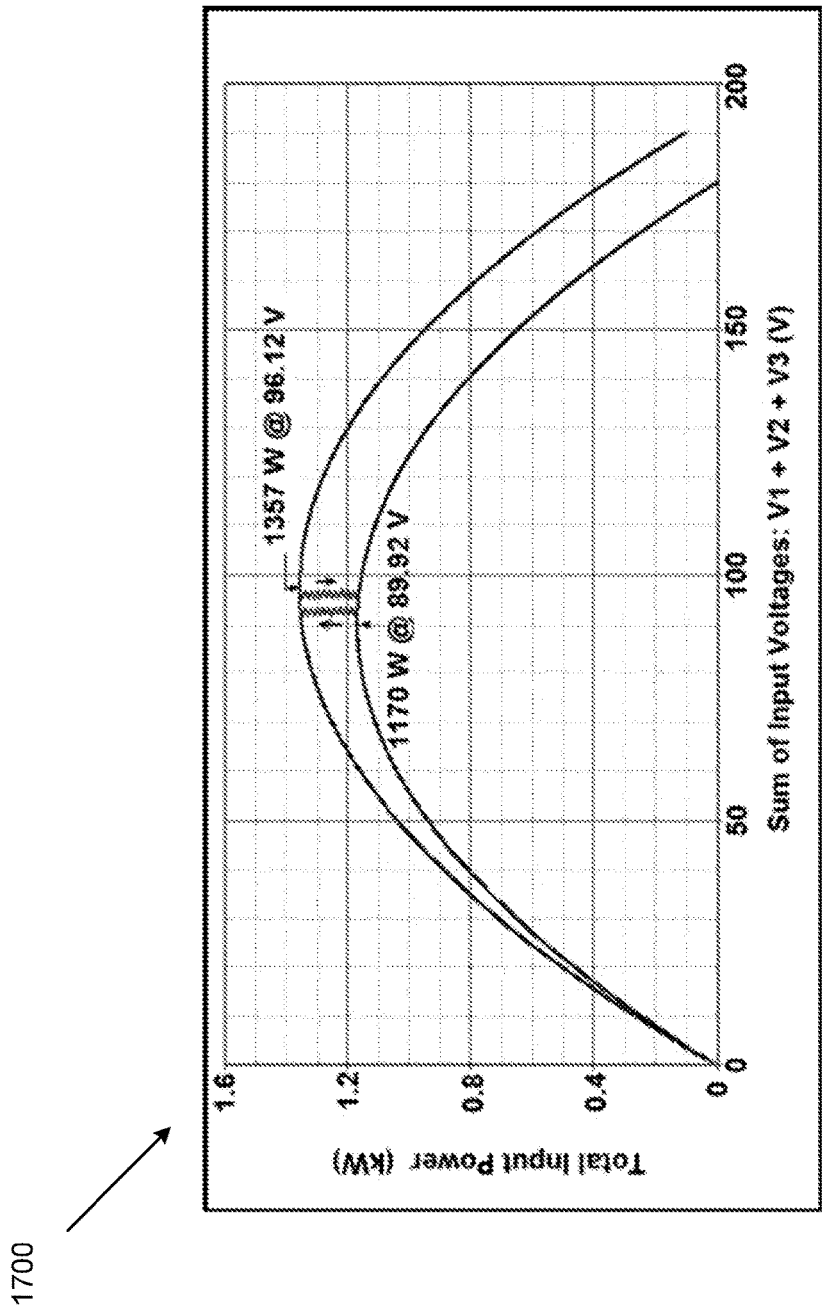
FIG. 17 is a graph illustrating an anticipated response of the battery dominated power system of FIG. 6 with a single MPT controller, according to an embodiment of the present invention.

FIG. 17 is a graph 1700 illustrating an anticipated response of battery dominated power system 600 of FIG. 6 with a single MPT controller, according to an embodiment of the present invention. Graph 1700 shows a possible transition from a lower peak power to a higher peak power due to changes in I-V characteristics of two power sources among three power sources controlled by DISO converters 604A, 604B, 604C of FIG. 6.

In graph 1700, the theoretical delivered power is shown as a function of the total sum of the distributed converter-input voltages under UVD control. For instance, when the three sources have identical open-circuit voltages of 60 VDC, the total peak-power voltage is 89.928 V, or 29.976 V per power source, and the total peak power is 1170 W, as shown in the lower curve. When open-circuit voltages of power source PS#1 and power source PS#3 are respectively changed to 80 V and 50 V, the total peak-power voltage becomes 96.122 V, or 32.04 V per power source, and the delivered peak power is 1357 W, as shown in the upper curve. Therefore, the peak power voltage per power source changes from 29.976 V to 32.04 V when MPT controller 602 is enabled.

DISO converters 604A, 604B, 604C have outputs connected in series across a battery that exhibits a very low impedance, such that output current $I_{BUS}$ is proportional to the total power delivered by power sources PS#1, PS#2, PS#3. A delta change in net output current $\Delta I_{BUS}$ delivered by DISO converters 604A, 604B, 604C always reflects a delta change in the total power delivered by power sources PS#1, PS#2, PS#3 ($\Delta P_{SOURCE}$). Superimposing a small AC dither voltage signal onto uniformly controlled converter input voltage signal $\Delta V_1$ results in an AC output current signal $\Delta I_{BUS}$ having three major phase responses. First, net output current signal $\Delta I_{BUS}$ and uniformly controlled converter input voltage signal $\Delta V_1$ are in-phase when the DC operating voltage across distributed converter input signal V1 is below the peak-power voltage. Second, net output current signal $\Delta I_{BUS}$ and uniformly controlled converter input voltage signal $\Delta V_1$ are 180° out of phase when input voltage signal V1 has a DC voltage above the peak-power voltage. Third, net output current signal $\Delta I_{BUS}$ and uniformly controlled converter input voltage signal $\Delta V_1$ are 90° out of phase when input voltage signal V1 is at the peak-power voltage.

Figure 18:
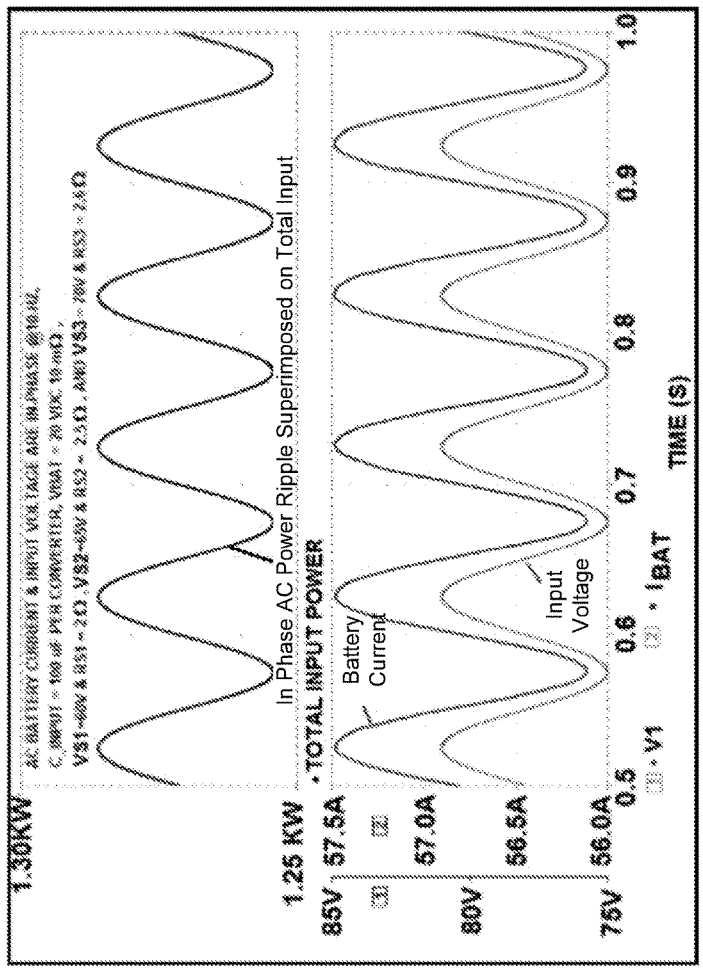
FIGS. 18-20 are graphs illustrating simulated alternating current (AC) response of distributed input voltage and system output current, according to an embodiment of the present invention.
Figure 19:
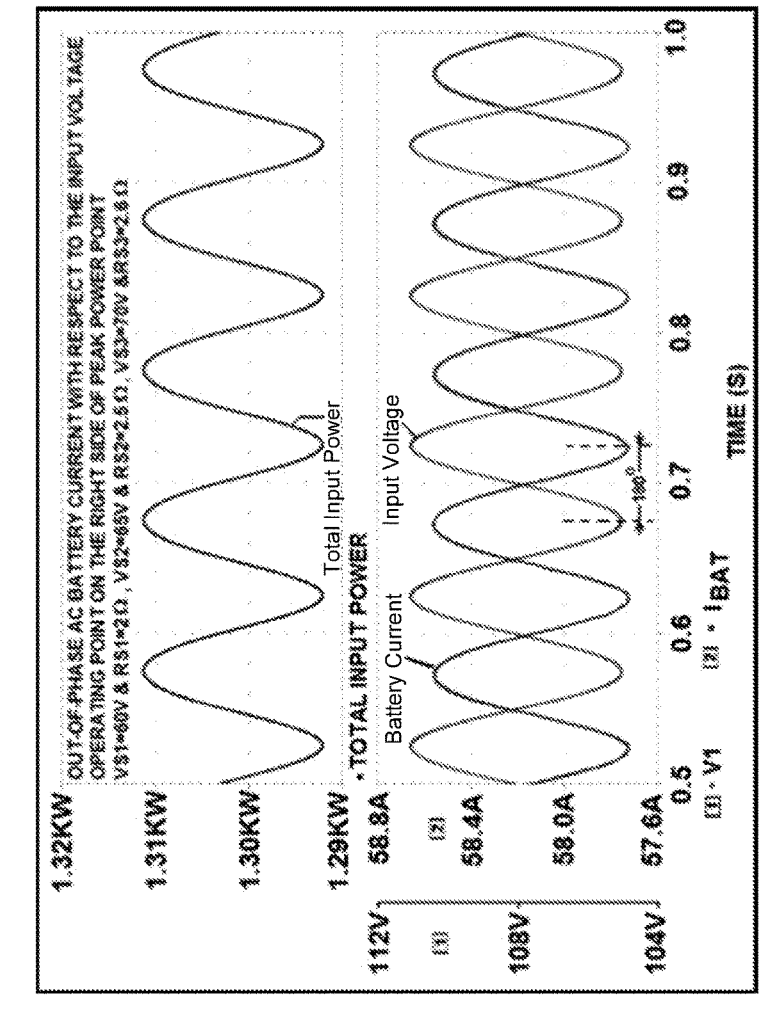
Figure 20:
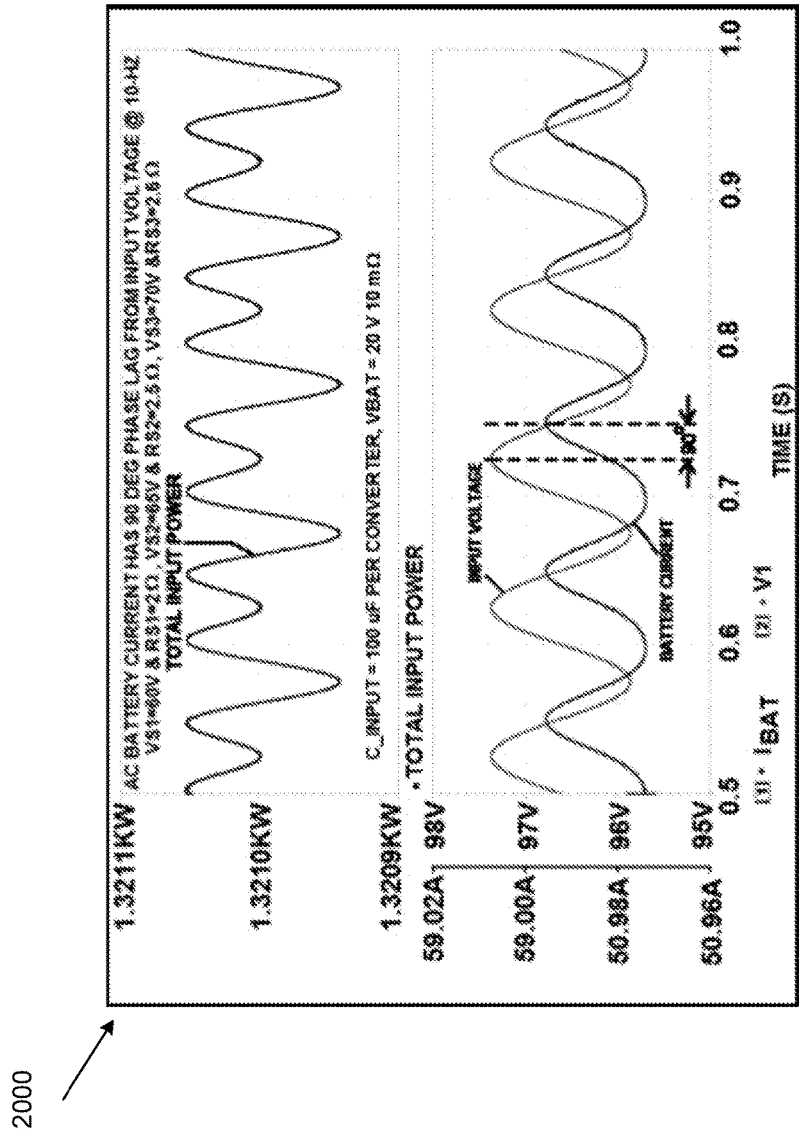

As shown in graphs 1800, 1900, and 2000 of FIGS. 18-20, the phase response between the two AC signals provide a basis for developing MPT controller 602 of FIG. 6 or MPT controller 1102 of FIG. 11. MPT controller 602, 1102 of FIGS. 6 and 11 can compare the two AC signals and slowly update the set point reference voltage signal $V_{SP}$. Set point reference voltage signal $V_{SP}$ commands the input voltage regulator to exert a control voltage signal $V_C$ to regulate the distributed-input voltage signal V1 at the system peak power voltage.

Figure 22:
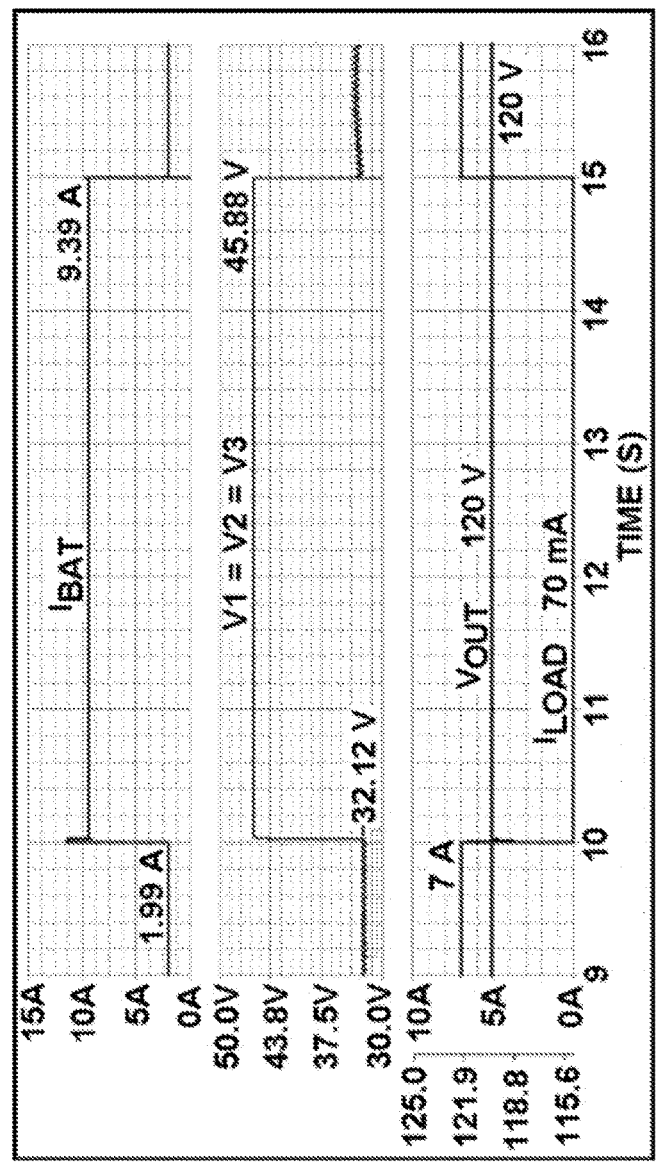
FIG. 22 is a graph illustrating a simulated response of three input voltages and a system regulated bus voltage for the dual-regulated bus power system of FIG. 11, according to an embodiment of the present invention.

FIG. 22 is a graph 2200 illustrating a simulated response of three input voltage signals V1, V2, V3 and a system regulated bus voltage signal $V_{OUT}$ for dual-regulated bus power system 1100 of FIG. 11, according to an embodiment of the present invention. Graph 2100 illustrates the simulated response of system output bus voltage signal $V_{OUT}$ in the bottom plot and the distributed-input voltages signal V1, V2, V3 depicted as three overlapping traces in the middle plot. Output bus voltage signal $V_{OUT}$ is regulated at 120 VDC at all times despite a 7 A step-load shown as a system load current trace $I_{LOAD}$ in the bottom plot. The 7 A step-load causes battery charge current $I_{BAT}$ to drop from 9.4 A to 1.99 A at time t=15 s since MPT controller 1102 still tracks the group peak-power voltage, V1=32.12 VDC, without loss of UIVD control.

Figure 23:
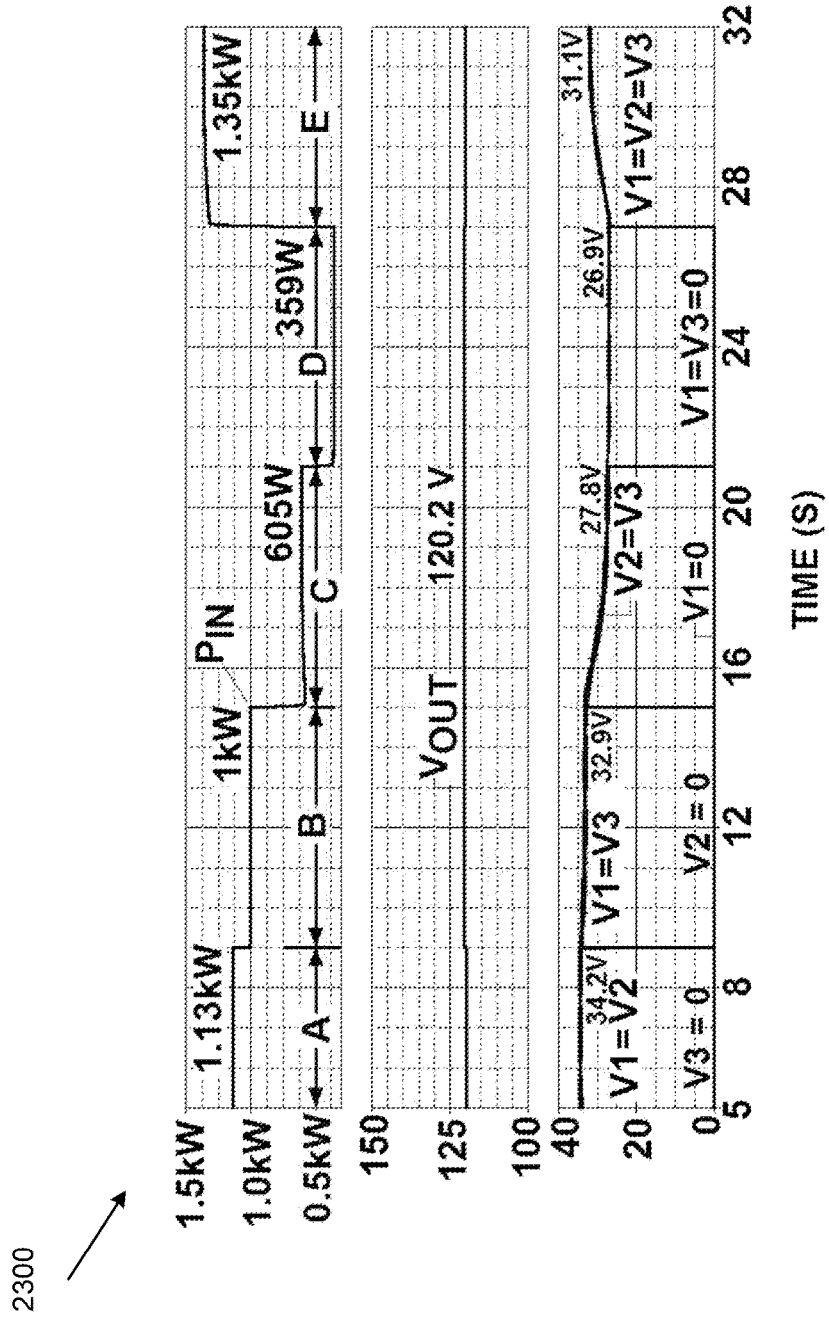
FIG. 23 is a graph illustrating a simulated response of distributed source voltages, system output voltages, and total sourcing power for the dual-regulated bus power system of FIG. 11, according to an embodiment of the present invention.

FIG. 23 is a graph 2300 illustrating a simulated response of distributed source voltage signals V1, V2, V3, system output voltage signal $V_{OUT}$, and total sourcing power signal $P_{IN}$ for dual-regulated bus power system 1100 shown in FIG. 11, according to an embodiment of the present invention. In particular, the simulated response includes GT-UVD control before, during, and after a power source failure. Graph 2300 shows the simulated response result of the distributed source voltage signals V1, V2, V3 in the bottom plot, the system output voltage signal $V_{OUT}$ in the middle plot, and total sourcing power signal $P_{IN}$ in the top plot. In other words, graph 2300 shows the system tolerance of more than one power source failures.

As shown in graph 2300, for time 5<t<9 s, power source PS#3 fails to deliver power (V3=0), and remaining power sources PS#1 and PS#2 are able to deliver their total sourcing power of 1137 W, resulting in 99.9% of tracking efficiency for power sources PS#1 and PS#2. For time 9<t<15 s, power source PS#2 fails (V2=0), and power sources PS#1 and PS#3 are able to deliver 1 kW as their total optimum power, revealing 99.7% of tracking efficiency for power sources PS#1 and PS#3. For time 15<t<21 s, power source PS#1 fails (V1=0), and 605 W of the total optimum power is produced from power sources PS#2 and PS#3, demonstrating 99.98% tracking efficiency. For time 21<t<27 s, two power sources, PS #1 and #3, fail and power source PS#2 delivers its optimum power of 359 W, which is almost the same as the 360 W ideal peak power that PS#2 can provide. As all three power sources PS#1, PS#2, PS#3 are restored to normal after time t=27 s, power sources PS#1, PS#2, PS#3 return to 1357 W, which is the total optimum power. During all five of these simulated scenarios, the system output voltage signal $V_{OUT}$ (the middle plot of FIG. 23) is well regulated at 120 V, and the voltages across any remaining functioning power sources are uniformly distributed as anticipated.

Figure 24A:
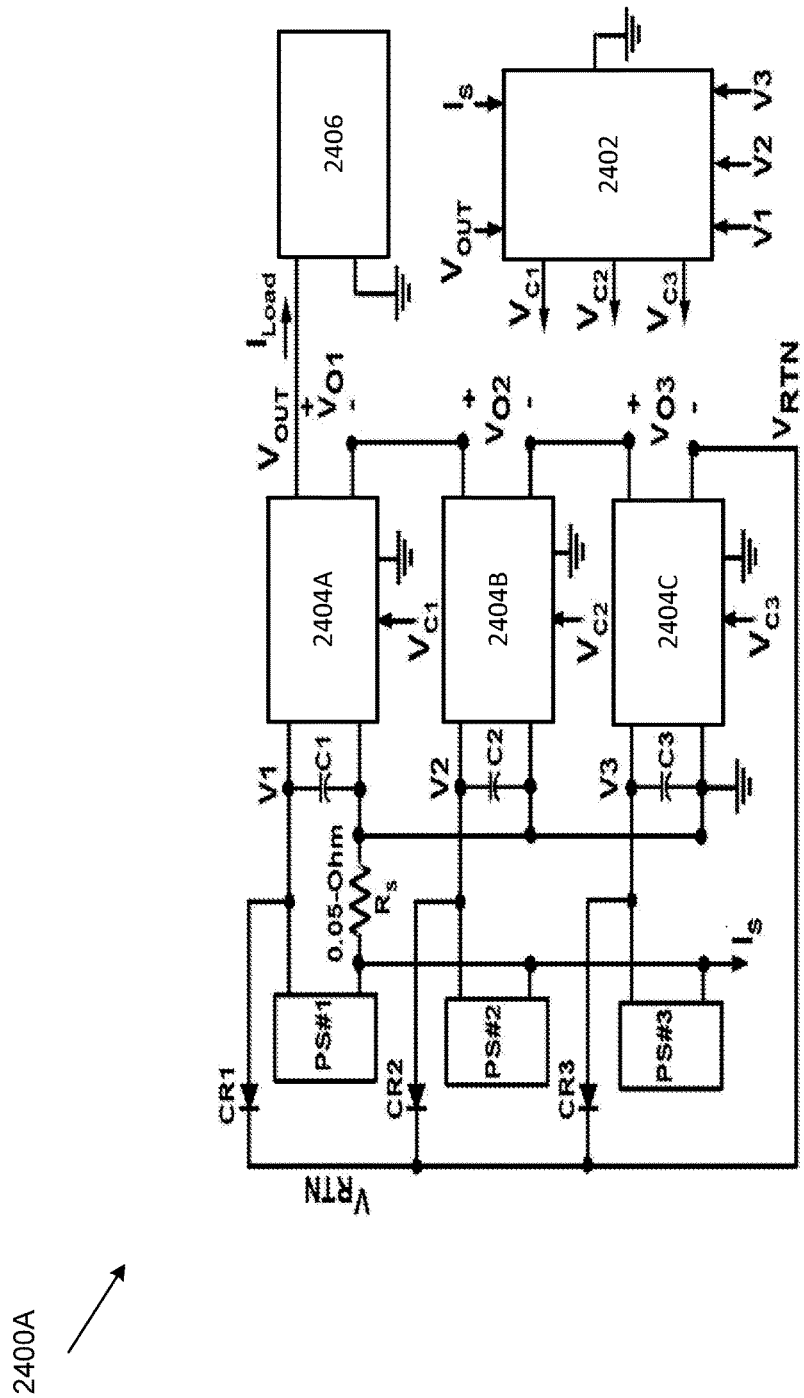
FIGS. 24A and 24B are block diagrams illustrating a three-channel DISO converter power system, according to an embodiment of the present invention.
Figure 24B:
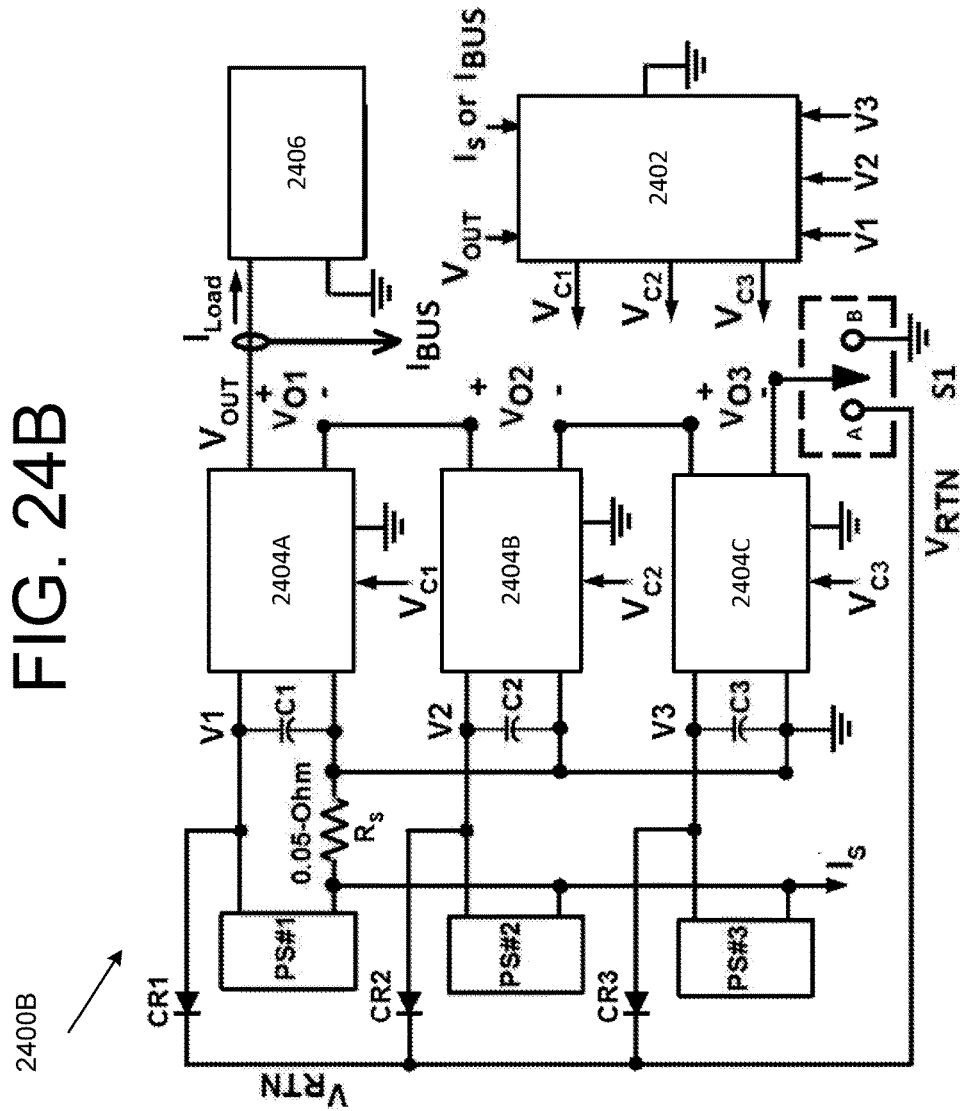

FIGS. 24A and 24B are block diagrams of a three-channel DISO converter power system 2400A, 2400B, according to an embodiment of the present invention. Power systems 2400A, 2400B include a system controller 2402 that has five feedback signals, i.e., voltage signals V1, V2, V3, output voltage signal $V_{OUT}$, and total sourcing current signal Is (or alternatively total output bus current $I_{BUS}$), to serve as inputs to system controller 2402. In this embodiment, sourcing voltage signals V1, V2, V3 are basic feedback signals for system controller 2402 to properly distribute three voltage control output signals $V_{C1}$, $V_{C2}$, $V_{C3}$ for equal sourcing voltages V1=V2=V3. System output voltage signal $V_{OUT}$ of DISO converters 2404A, 2404B, 2404C is fed back to system controller 2402 such that output voltage signal $V_{OUT}$ is regulated under normal operating conditions, which are considered to be in a non-maximum power tracking (non-MPT) mode. Total sourcing current signal $I_S$ may serve as a mandatory signal for computation of the total sourcing power signal instead of the use of the total output bus current $I_{BUS}$. It should be appreciated that system controller 2402 may operate in the same or similar manner as system controller 602 of FIG. 6 and/or system controller 1102 of FIG. 11.

Resistor $R_s$ in FIGS. 24A and 24B serves as a current sensor of all sourcing currents drawn from distributed power sources PS#1, PS#2, PS#3. In this manner, the voltage drop across resistor Rs is proportional to the total sourcing current contributed by each power source PS#1, PS#2, PS#3. When one terminal of resistor Rs is tied to the system ground, the other terminal of resistor $R_S$ is connected to node Is to provide a negative voltage having the magnitude being proportional to the total sourcing current. Again, each capacitor C1, C2, and C3 is terminated across its respective distributed power source PS#1, PS#2, PS#3 or across the respective input of DISO converter 2404A, 2404B, 2404C. Capacitors C1, C2, C3 are configured to provide sufficient filtering of distributed currents drawn by DISO converters 2404A, 2404B, 2404C such that the currents drawn from respective power sources PS#1, PS#2, PS#3 have negligible AC content at the converter switching frequency.

In FIG. 24B, power system 2400B includes a selectable switch S1. Selectable switch S1 is configured to provide for two design choices of power architectures with a regulated system bus voltage signal $V_{OUT}$: position A and position B of selectable switch S1.

In the embodiment associated with position A, power system 2400B uses a non-isolated input-series connection to DISO converters 2404A, 2404B, 2404C. In the non-isolated input-series connection, distributed sourcing voltage signals V1, V2, V3 may be a direct contributor of system output voltage signal $V_{OUT}$. Also, in this embodiment, three paralleled paths of distributed sourcing voltage signals V1, V2, V3 are connected in series with an output voltage string comprising three series-connected outputs of DISO converters 2404A, 2404B, 2404C. Three paralleled-cathode diodes CR1, CR2, CR3 may provide a common sourcing voltage signal $V_{RTN}$ configured to collect three currents drawn from distributed power sources PS#1, PS#2, PS#3 having distributed sourcing voltage signals V1, V2, V3, respectively connected to anodes of diodes CR1, CR2, CR3.

As a result, when selectable switch S1 is in position A, a non-isolated power architecture can be achieved. In the non-isolated power architecture, the output power return of DISO converters' 2404A, 2404B, 2404C series-connected output is connected to common sourcing voltage node $V_{RTN}$, leading to a non-isolated system output voltage signal $V_{OUT}$. Output voltage signal $V_{OUT}$ may become the summation of series-connected output voltages of DISO converters 2404A, 2404B, 2404C and common sourcing voltage signal $V_{RTN}$. When selectable switch S1 is in position A, a higher power conversion efficiency can be easily obtained since common sourcing voltage signal $V_{RTN}$ at the common sourcing voltage node $V_{RTN}$ may provide a direct power contribution to the total system output power. System output voltage signal $V_{OUT}$ includes four series-connected voltage signals: output voltage signals $V_{O1}$, $V_{O2}$, $V_{O3}$ obtained from three DISO converters 2404A, 2404B, 2404C, and common sourcing voltage signal $V_{RTN}$.

When selectable switch S1 is moved to position B, power system 2400B utilizes an isolated output-series connection with DISO converters 2404A, 2404B, 2404C. In this embodiment, the series-connected outputs of DISO converters 2404A, 2404B, 2404C are the contributor of system output voltage signal $V_{OUT}$. Also, in this embodiment, paralleled-cathode diodes CR1, CR2, CR3 are not used and may also be removed from power system 2400B.

When selectable switch S1 is in position B, an isolated input/output power architecture can be achieved. For example, the power return of the series connected output of DISO converters 2404A, 2404B, 2404C is grounded, and common sourcing voltage signal $V_{RTN}$ or paralleled-cathode diodes CR1, CR2, and CR3 are not used. This leads to an input-output isolation capability where isolated system output voltage signal $V_{OUT}$ includes the series-connected output voltages of DISO converters 2404A, 2404B, 2404C. The input power return for all DISO converter inputs can be electrically isolated (as an option) from the system GROUND, i.e. the ground symbol connected to the negative terminal of capacitor C3 can be removed or replaced by a different ground node that is isolated from the system output ground node.

B position of switch S1 is also configured to provide electrical isolation between distributed power sources PS#1, PS#2, PS#3 and system output voltage signal $V_{OUT}$. This way, system output voltage signal $V_{OUT}$ includes the summation of three series-connected voltage signals: output voltage signals $V_{O1}$, $V_{O2}$, $V_{O3}$ obtained from DISO converters 2404A, 2404B, 2404C.

Figure 25A:
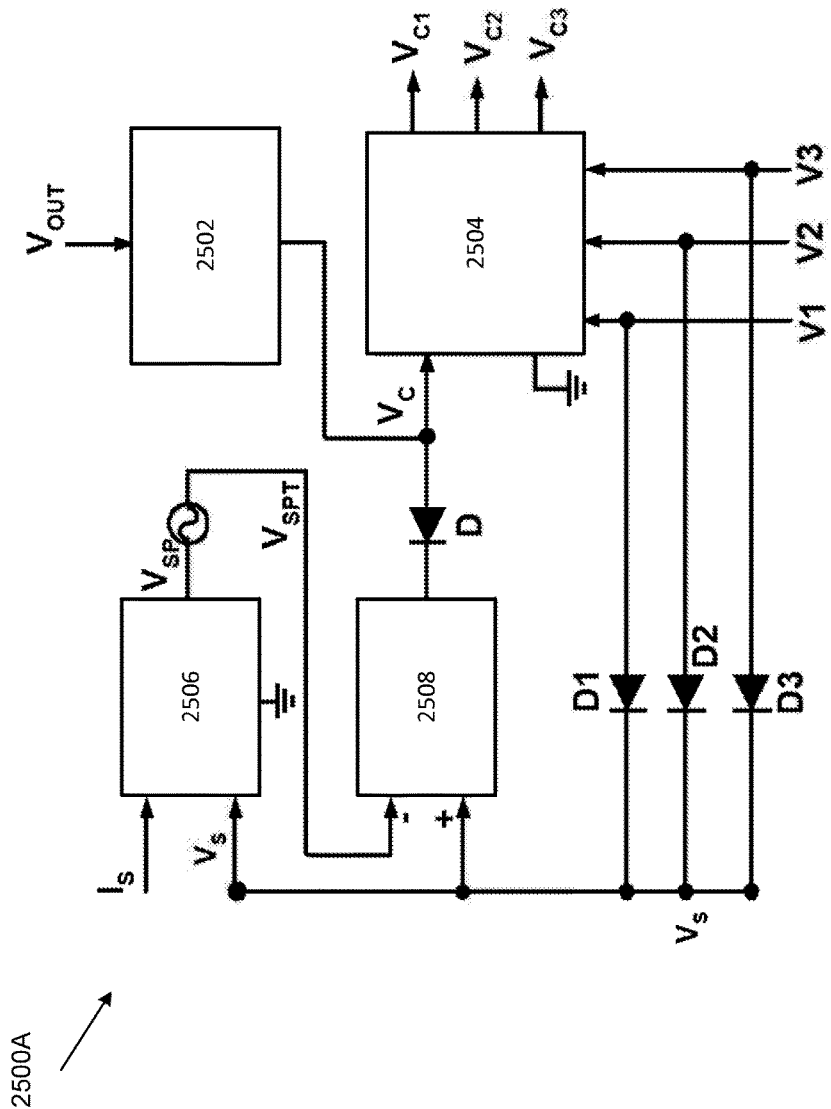
FIGS. 25A and 25B are block diagrams illustrating the system controller of FIG. 24, according to an embodiment of the present invention.
Figure 25B:
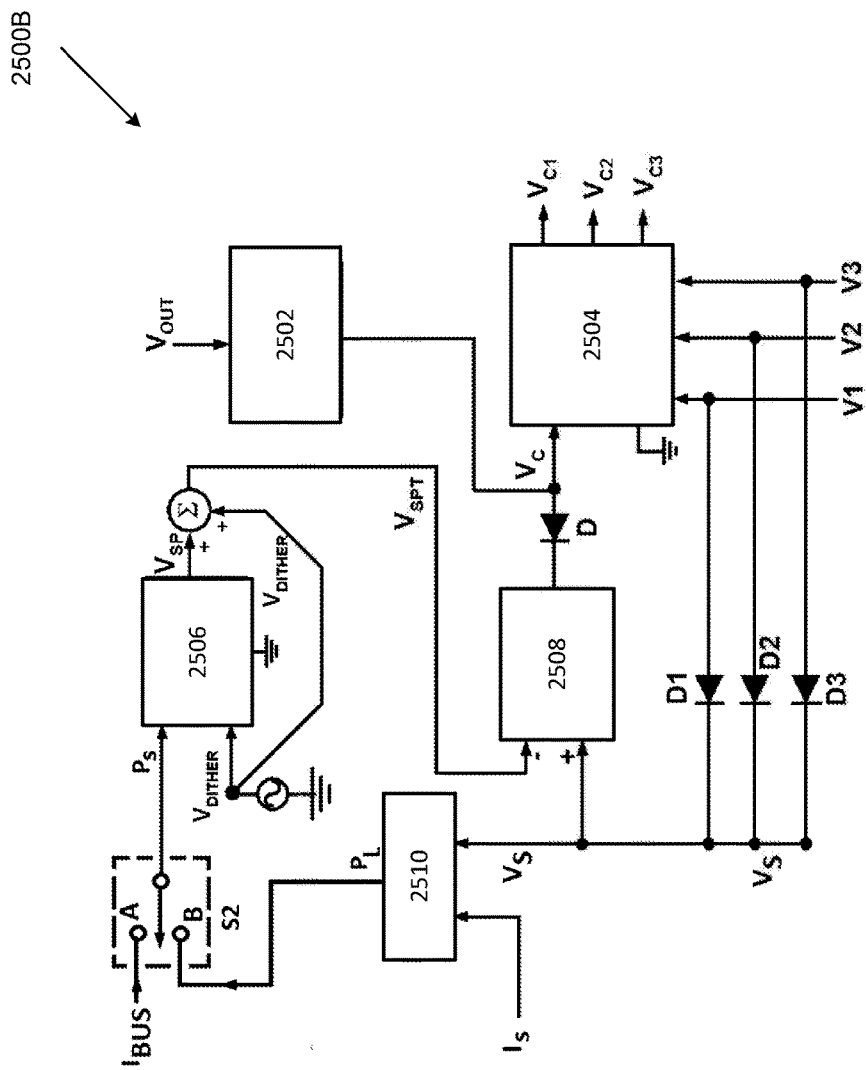

FIGS. 25A and 25B are block diagrams illustrating system controller 2500A, 2500B, according to an embodiment of the present invention. System controller 2500A, 2500B may be system controller 2402 shown in FIGS. 24A and 24B, respectively. In FIGS. 25A and 25B, the following control functions may be implemented: output voltage regulation (OVR) 2502, identification of a maximum-power voltage candidate through MPT controller 2506, input voltage regulation (IVR) 2508, and uniform input voltage distribution (UIVD) 2504.

In FIG. 25B, system controller 2500B also includes a selectable switch S2 configured to select feedback current signal as total output bus current signal $I_{BUS}$ (position A) or total sourcing current signal $I_S$ (position B).

In one embodiment, selectable switch S2 selects position A when total output bus current signal $I_{BUS}$ is used for MPT control. This occurs when system load 2406 shown in FIG. 24B includes a sufficiently large filtering capacitance as compared to the internal filtering capacitance across the total output of the DISO converters. As the system load possesses a large load capacitance, total output bus current signal $I_{BUS}$ may provide an AC ripple content representing the total AC power ripple, which is the main ingredient for MPT control to detect the control direction toward the peak power condition.

In a further embodiment, selectable switch S2 selects position B when total sourcing current signal $I_S$ is used for MPT control instead of total output bus current signal $I_{BUS}$. This may occur when system load 2406 does not possess a sufficiently large filtering capacitance as compared to the internal filtering capacitance across the total output of the DISO converters, leading to the inability of total bus current signal $I_{BUS}$ to represent the small-signal variation of the power signal. When selectable switch moves to position B, power signal $P_L$ is computed using multiplier 2510. For example, multiplier 2510 computes power signal $P_L$ through multiplication between total sourcing current signal $I_S$ and maximum-limit voltage signal $V_S$. Consequently, computed power signal $P_L$ is fed to the input of MPT controller 2506 input as the power signal $P_S$. Power signal $P_L$ provides a true representative of small-signal variation of power at the cost of an extra multiplier. In either position A or position B of selectable switch S2, streamlined MPT controller 2506 is applicable since the internal dither signal is used to feed the other input of MPT controller 2506 instead of maximum-limit voltage signal $V_S$.

Under a non-MPT mode of operation, OVR controller 2502 may actively regulate system output voltage signal $V_{OUT}$ by delivering a primary control signal $V_C$ while MPT controller 2506 and IVR controller 2508 are in stand-by mode. This way, MPT controller 2506 and IVR controller 2508 do not interfere with the normal OVR function. Diode D may be reverse-biased to prevent the IVR control from being in conflict with the output voltage regulation since the sourcing voltages under normal OVR mode are above the minimum sourcing voltage corresponding to the stand-by minimum set-point voltage signal $V_{SP-MIN}$ or idle $V_{SP}=V_{SP\_MIN}$.

Whenever the load demand across output voltage signal $V_{OUT}$ exceeds the system maximum power, OVR controller 2502 loses its active regulation, and the sourcing voltages collapse toward idle minimum sourcing voltage signal $V_{SP}=V_{SP\_MIN}$. The sourcing voltage collapse triggers MPT controller 2506 and IVR controller 2508 to engage control contribution to primary control signal $V_C$ since diode D becomes forward-biased. Forward-biased diode D provides an active pull-down to system control voltage signal $V_C$ that is no longer controlled by OVR controller 2502 since the output impedance of IVR controller 2508 becomes significantly less than the output impedance of OVR controller 2502. When the transition from OVR mode to MPT mode occurs, the set point voltage signal $V_{SP}$ starts increasing from its minimum idle voltage signal $V_{SP\_MIN}$, which corresponds to the minimum sourcing voltage. Consequently, maximum-limit sourcing voltage signal $V_S$ is regulated by IVR controller 2508 to track a voltage value corresponding to maximum-power set point voltage signal $V_{SP}$. In certain embodiments, maximum-limit sourcing voltage signal $V_S$ is obtained from the strongest power source among the three distributed power sources through the maximum-limit detection circuit, e.g., three paralleled-cathode diodes D1, D2, and D3. Furthermore, maximum-limit sourcing voltage signal $V_S$ also possesses a low-frequency AC signal content that is in phase with the AC dither signal being superimposed on the maximum-power set-point voltage signal $V_{SP}$.

In this embodiment, UIVD controller 2504 has sufficient gain and control bandwidth such that the sourcing voltages belonging to weak power sources can be regulated to track the sourcing voltage belonging to the strongest power source. UIVD controller 2504 may still function properly even with the presence of a short circuit fault across any power source because voltages across the remaining functional power sources are controllable to be uniformly distributed or nearly equal. This allows the 3-channel DISO power system to tolerate failures in up to two of the three power sources.

Figure 26:
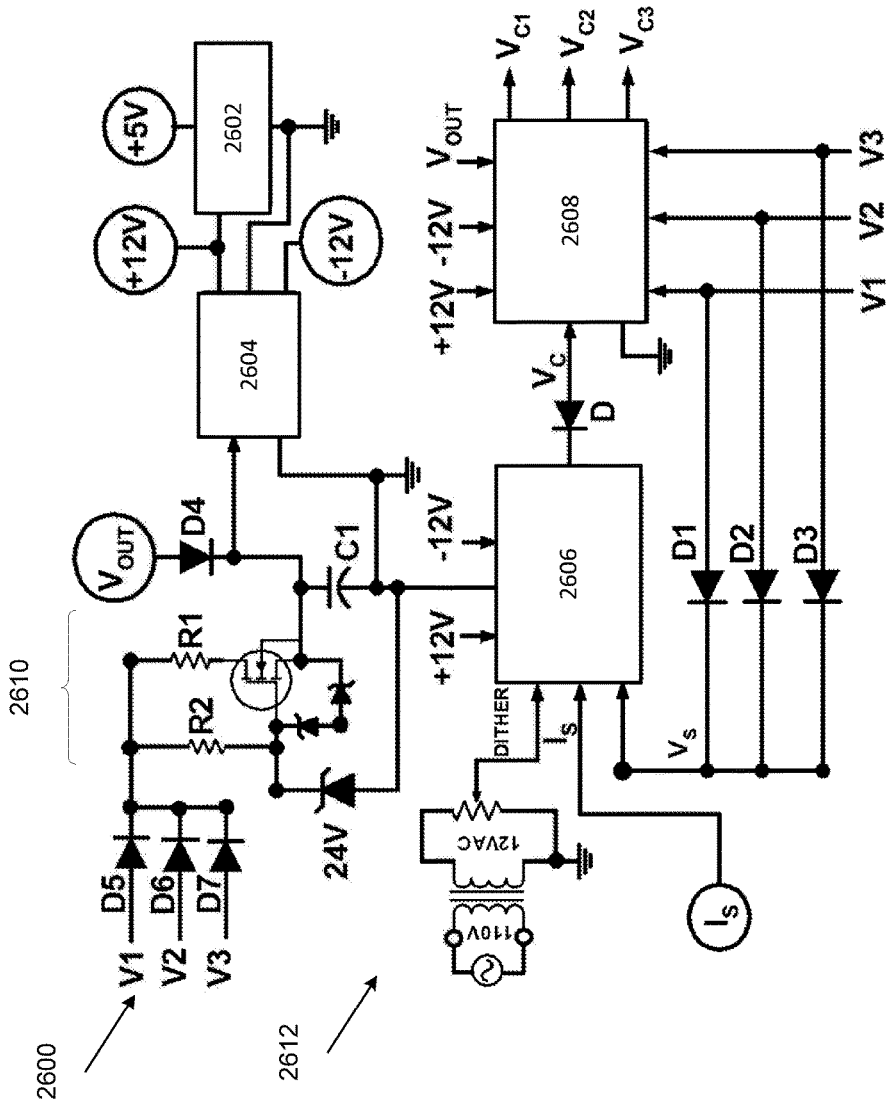
FIG. 26 is a block diagram illustrating a house keeping power supply (HKPS), according to an embodiment of the present invention.

FIG. 26 is a block diagram illustrating a HKPS 2600, according to an embodiment of the present invention. In this embodiment, HKPS 2600 includes input voltage signals V1, V2, and V3 and output voltage signal $V_{OUT}$. Diodes D5, D6, D7 form a parallel-cathode network that supplies the highest sourcing voltage among voltage signals V1, V2, V3 to a front-end linear regulator circuit 2610. Front-end linear regulator circuit 2610 includes passive components and an N-channel metal-oxide-semiconductor field-effect transistor MOSFET, and is configured to provide a start-up input voltage across capacitor C1 for HKPS converter 2604 to process into +12 V and −12 V DC output voltages. The ±12 V voltages shown in FIG. 26 provide necessary supply voltages to OVR and UIVD controller PCB 2608 and IVR and MPT controller PCB 2606.

A +5 V regulator 2602 is configured to provide +5 VDC output from the +12 V input. The +5 V bias is supplied to three opto-coupler interface circuits that transport distributed control signals $V_{C1}$, $V_{C2}$, $V_{C3}$ through their respective opto-couplers to shared buses SB1, SB2, SB3, respectively. It should be appreciated that a +VCC node associated with each opto-coupler interface circuit, as shown in FIG. 5, is biased by the +5V. A dither signal injection is fed externally at the DITHER input of MPT and IVR controller PCB 2606 through a step-down transformer 2612 that converts a 60 Hz 110 VAC utility grid voltage to a 12 VAC voltage with a potentiometer serving as a voltage divider for fine tuning a proper amount of the small-signal injection into the MPT control loop.

Figure 27:
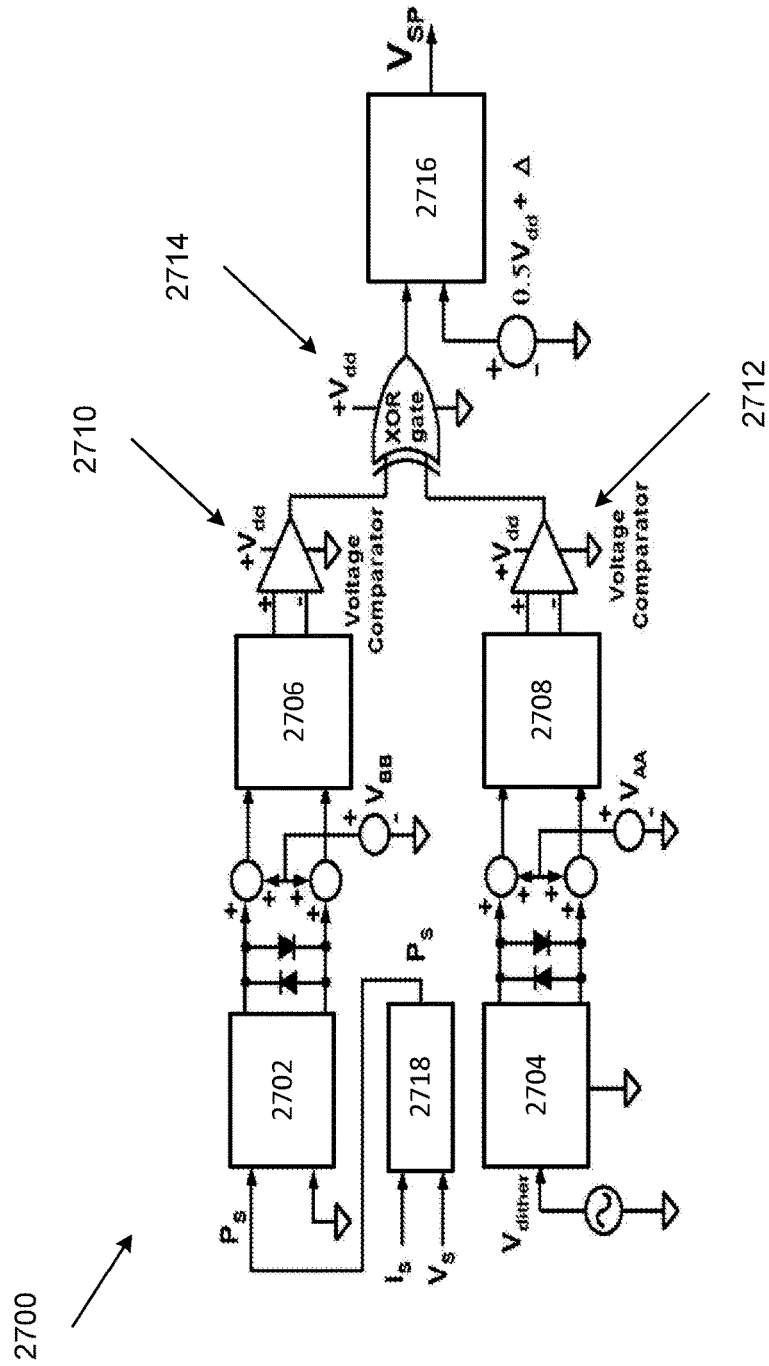
FIG. 27 is a block diagram illustrating a MPT controller with a multiplier for power calculation, according to an embodiment of the present invention.

FIG. 27 is a block diagram illustrating a MPT controller 2700 with a multiplier 2718 for power calculation, according to an embodiment of the present invention. In this embodiment, multiplier 2718 is configured to compute total input power signal $P_S$ as the feedback input to high pass filter 2702 instead of sourcing output bus current $I_{BUS}$, as shown in FIG. 14. This power signal Ps extraction, based on multiplication between input voltage signal $V_S$ and total input sourcing current signal $I_s$, can be used instead of sourcing output bus current signal $I_{BUS}$ because the COTS converters possess significant internal output capacitances that distort the phase response of sourcing output bus current signal $I_{BUS}$.

It should be appreciated that high pass filters 2702, 2704, low pass filters 2706, 2708, voltage comparators 2710, 2712, XOR gate 2714, and voltage integrator 2716 have similar functionalities to high pass filters 1402, 1404, low pass filters, 1406, 1408, voltage comparators 1410, 1412, XOR gate 1414, and voltage integrator 1416, respectively, of FIG. 14.

Some embodiments discussed herein pertain to UIVD control for a DISO converter power system. The UIVD control for DISO converters achieves grouped maximum power throughput from non-identical renewable power sources. Also, in some embodiments, a single MPT controller is configured to facilitate simultaneous processing of distributed power flows. For example, when distributed power sources have similar peak power voltages with an achievable tracking efficiency of greater than 96%, multiple MPT controllers are not necessary. By utilizing UIVD control, near-maximum use of available power is achieved using a single MPT controller. Thus, the resulting power system and control architecture offers near-maximum power transfer with a lower part count.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a plurality of distributed-input series-output (DISO) converters, each of the plurality of DISO converters comprises an input connected to a corresponding power source; and
a controller operably connected to the plurality of DISO converters, wherein the controller is configured to provide uniform input voltages across each power source while tracking an optimum power point, and is further configured to regulate a system distributed input voltage at an optimum peak power voltage determined by a maximum power tracking control when a battery bank voltage signal and a battery charge current are below a preset voltage value and a preset charge current set point value.

2. The apparatus of claim 1, wherein each of the plurality of DISO converters further comprises an output configured to form a two-terminal network of series connected voltages across a battery bank.

3. The apparatus of claim 1, wherein the controller comprises a battery charge controller configured to regulate a battery bank voltage signal to a preset value based on a voltage-temperature profile to prevent overcharging of a battery.

4. The apparatus of claim 1, wherein the controller further comprises a maximum power tracking controller configured to update a set point voltage signal to command an input-voltage regulation control loop, the input-voltage regulation control loop configured to regulate a plurality of distributed sourcing voltages at an optimum power point voltage.

5. The apparatus of claim 4, wherein the maximum power tracking controller is further configured to compare an input voltage signal and an output current signal to update the set point voltage signal, the set point voltage signal configured to command an input voltage regulator to generate a control voltage signal to regulate each of the plurality of distributed sourcing voltages at the optimum power point voltage.

6. The apparatus of claim 1, wherein the controller further comprises a uniform voltage distribution controller configured to generate a distributed control voltage for each of the plurality of DISO converters such that optimum power is delivered from each power source.

7. An apparatus, comprising:
a multi-channel distributed-input series-output (DISO) power system comprising outputs that are connected in series across a battery bank; and
a controller configured to apply a plurality of distributed control voltages, wherein each of the plurality of distributed control voltages is connected across a control input port of each independently sourced DISO converter such that uniform input voltage is achieved across each of a plurality of power sources.

8. The apparatus of claim 7, wherein the multi-channel DISO power system comprises a plurality of independently sourced DISO converters, each of the plurality of independently sourced DISO converters comprises an input connected to a corresponding power source.

9. The apparatus of claim 8, wherein each of the plurality of independently sourced DISO converters is connected to a corresponding power source.

10. The apparatus of claim 8, wherein, when at least one power source fails, the controller is further configured to uniformly distribute voltages across each remaining power source.

11. The apparatus of claim 8, wherein the controller comprises a maximum power tracking controller configured to update a set point voltage signal to command an input voltage regulation control loop, the input voltage regulation control loop configured to regulate each of a plurality of distributed input voltages at a group peak-power voltage.

12. An apparatus, comprising:
a plurality of distributed-input series-output (DISO) converters, each of the plurality of DISO converters comprise an input connected to a corresponding power source, and configured to provide a total output bus current signal fulfilling a system load demand and a total sourcing current signal being a summation of all sourcing current signals drawn from a plurality of distributed power sources; and
a system controller configured to
receive a plurality of sourcing voltage signals from the plurality of distributed power sources, and generate a plurality of output voltage control signals for equal sourcing voltages at all times,
receive the total sourcing current signal or the total output bus current signal, and generate a plurality of the output voltage control signals to draw a total maximum power from each of the plurality of distributed power sources when in a maximum power tracking mode, and
regulate a system output voltage signal received from the plurality of DISO converters when in a non-maximum power tracking mode.

13. The apparatus of claim 12, further comprising:
a first set of paralleled-cathode diodes configured to provide a maximum limit voltage signal within the system controller to capture a highest voltage signal among the plurality of sourcing voltage signals across the plurality of distributed power sources.

14. The apparatus of claim 13, further comprising:
a second set of paralleled-cathode diodes configured to provide a common sourcing voltage signal from the plurality of sourcing voltage signals outside of the system controller to collect currents drawn from the plurality of distributed power sources.

15. The apparatus of claim 12, wherein the system output voltage signal comprises a plurality of voltage signals obtained from series-connected output voltage signals of the DISO converters or a summation of the series-connected output voltage signals and a common sourcing voltage signal.

16. The apparatus of claim 12, wherein the system controller comprises a maximum power tracking (MPT) controller configured to compute a set point voltage signal using a combination of two input signals, wherein the two input signals comprise any one of the following pairs: the total sourcing current signal and a maximum limit sourcing voltage signal, the total output bus current signal and the maximum limit sourcing voltage signal, the total output bus current signal and an alternating-current (AC) dither signal, or a maximum limit sourcing power and the AC dither signal.

17. The apparatus of claim 16, wherein the maximum limit sourcing voltage signal is regulated to a dithered set point voltage signal, the dithered set point voltage signal comprises a summation of the set point voltage signal and the AC dither signal.

18. The apparatus of claim 17, wherein the maximum limit sourcing voltage signal is obtained from a strongest power source from the plurality of distributed power sources.

19. The apparatus of claim 17 wherein the maximum limit sourcing voltage signal comprises a low frequency AC signal being in phase with the AC dither signal superimposed on the set point voltage signal.

20. The apparatus of claim 12, wherein the system controller further comprises a diode configured to prevent a voltage control signal transmitted from an input voltage regulator from conflicting with a voltage control signal transmitted from an output voltage regulation controller under an output voltage regulation mode.

21. The apparatus of claim 20, wherein the diode is further configured to prevent the voltage control signal transmitted from the output voltage regulation controller from conflicting with the voltage control signal transmitted from the input voltage regulator under a maximum power tracking mode.

* * * * *